United States Patent

[11] 3,602,788

| | | |
|---|---|---|
| [72] | Inventors | Takao Kawabe;<br>Yoshiyuki Kawabe, both of 41-5,<br>Higashiogu 2 chome, Arakawa-ku, Tokyo,<br>116, Japan |
| [21] | Appl. No. | 876,506 |
| [22] | Filed | Nov. 13, 1969 |
| [45] | Patented | Aug. 31, 1971 |

[54] MULTISTAGE VOLTAGE REGULATING APPARATUS FOR ALTERNATING CURRENT MACHINES
19 Claims, 28 Drawing Figs.

[52] U.S. Cl. .................................................. 318/229,
318/419, 323/50, 323/51, 323/85
[51] Int. Cl. ..................................................... H02p 1/10
[50] Field of Search .......................................... 318/228,
229, 419; 323/48, 50, 51, 60, 62, 85

[56] References Cited
UNITED STATES PATENTS

| 1,242,250 | 10/1917 | Seede ........................... | 323/85 X |
| 1,385,170 | 7/1921 | Herz ............................ | 323/85 X |
| 1,910,381 | 5/1933 | Dowling ....................... | 323/50 X |
| 3,381,198 | 4/1968 | Kawabe ........................ | 323/85 X |

FOREIGN PATENTS

| 446,882 | 3/1969 | Japan ........................... | 323/48 |

Primary Examiner—J. D. Miller
Assistant Examiner—A. D. Pellinen
Attorney—Cushman, Darby and Cushman ABSTRACT: A multistage voltage regulating apparatus for AC machines, which includes a bypass magnetic path with a flux leakage preventing winding thereon provided locally in an endless magnetic path for dividing the endless magnetic path into two or more magnetic path sections. Each of the magnetic path sections are provided with a main circuit winding and a secondary winding having ampere turns inverse to but equivalent to those of the corresponding main circuit winding, whereby the on-load voltage is regulated in multiple stages by opening and closing the circuit of said secondary winding. By closing the circuit of the flux leakage preventing winding when the bypass path is not needed (when associated secondary windings are open circuited), unwanted leakage flux can be substantially prevented to maintain the desired regulated voltage under all conditions.

(Neutral Point)

Takao Kawabe
Yoshiyuki Kawabe
INVENTORS

BY

Cushman, Darby & Cushman
ATTORNEYS

MULTISTAGE VOLTAGE REGULATING APPARATUS FOR ALTERNATING CURRENT MACHINES

BACKGROUND OF THE INVENTION a. Field of the Invention

The present invention is concerned with a multistage voltage regulating apparatus for use in AC machines such as AC motor starters and electric quenching furnaces.

b. Description of the Prior Art

In view of the fact that AC motors and other AC machines are characterized in that they require a large starting current, it has been the practice to use devices such as a Stardelta starter, a starting compensator, a reactor starter or the like to perform the starting under a reduced voltage and to enter into normal operation by switching-over the voltage to the rated voltage following the attenuation of the starting current to a predetermined value. In certain AC machines, such as an electric quenching furnace, in which the load is not specifically established, it is necessary that the operating voltage be regulated by selectively switching over the terminals so as to comply with the load applied.

It has been necessary, in general, for the voltage regulating apparatuses of the aforesaid types for use in AC machines to employ, in their main circuits, large size switches having the same capacity as that required by the power switches. More specifically, in a starting compensator, it is necessary to provide a neutral point switch and also a switch for directly connecting the motor to the power source after the motor has been started. A reactor starter, on the other hand, requires a reactor shorting switch. Since these switches were directly connected in the main circuit, it has been necessary to use those having a large size and a capacity same as that of the power switch, and accordingly they were expensive.

However, the aforesaid switches for the main circuit which are connected in said main circuit had the drawback that they caused sparks at the time of changing-over the connections, causing a marked wear of the contacts. This is especially true in such machines as those requiring frequent changing-over operations, causing a marked loss of the service life of the machines. Such a drawback is particularly markedly encountered in machines employing those switches which are designed for use with large current, high voltage circuits which are being utilized with a progressive increase in number of late.

The author previously invented a reactor starter of an extended service life which eliminates the foregoing shortcomings and which is practically free of the wear of the contacts even when incorporated in a high voltage, large current circuit. The author has obtained, for example, U.S. Pat. No. 3,381,198 and U.K. Pat. No. 1,097,427 for his aforesaid invention. This invention has since been put into practice with a good reputation. However, this prior reactor starter performs the switching-over of voltage only in a single stage, and it is impossible to effect multistage voltage switching-over performance of two or more stages with this reactor starter of the prior invention.

SUMMARY OF THE INVENTION

It is, therefore, the primary object of the present invention to provide a multistage voltage regulating apparatus for use in alternating current machines, said apparatus representing an improvement in the prior invention of the author and being capable of effecting multistage switching-over operation while retaining all of the desirable features of the author's prior invention by utilizing magnetic bypass paths to provide a plurality of endless magnetic paths for such multistage operations and including leakage flux preventing windings on such bypass paths for effectively preventing leakage flux therethrough when the bypass path is not needed. For instance, when a single bypass path is used, three endless magnetic paths are available to provide three stages of operation, namely a single overall loop not including the bypass path and two smaller loops, each including the bypass path. When the overall loop is used, the leakage preventing winding circuit is closed to prevent undesired flux leakage and to thus maintain the desired regulated output voltage.

Another object of the present invention is to provide a multistage voltage regulating apparatus for use in AC machines, which, in spite of the fact that it requires no such expensive main circuit switch having the same capacity as that of the power switch, is capable of performing the desired voltage switching-over operation in two or more stages freely and easily.

Conventional starters such as those utilizing a starting compensator or reactor starters of the prior art were provided with selective terminals of a reduced voltage, such as 50 percent, 65 percent and 80 percent of the rated voltage, for the regulation of the starting torque and the starting current, so that one could make the selective use of any one of these terminals in accordance with the condition of the load. For example, in case it is not possible to start such a machine as a centrifugal separator, a blower or the like which has a heavy inertia load characteristic by the use of a low voltage in the range of from 50 percent to 65 percent of the rated voltage, the starting of this machine could require the application of a higher voltage such as 80 percent of the rated value or a voltage as high as 100 percent in some instances. Thus, it was required to make the selective use, in accordance with the load condition, of a specific terminal through which the desired starting voltage was to be obtained. With these conventional starters, however, a great length of time was consumed in performing such operations as the insulation of the terminals in selecting the required terminal, and moreover, these operations were quite complicated in nature. Furthermore, it has been impossible, as a matter of fact, to change the connections of the terminals of the aforesaid conventional starters during the course of operation.

Still another object of the present invention to provide a multistage voltage regulating apparatus for AC motors, which obviates the provision of the aforesaid selective terminals that have been necessary in the conventional starters and which is capable of easily altering the starting voltage as desired in spite of the absence of such selective terminals.

Yet another object of the present invention is to provide a multistage voltage regulating apparatus for use in AC motors, which is capable of altering, as desired, the voltage applied to the motor also during the course of progressive elevation of the rotation speed of the motor.

A further object of the present invention is to provide a starter which requires markedly fewer fabricating materials as compared with the conventional starting compensators, reactor starters or the like, and which, accordingly, can be provided at a much lower manufacturing cost.

A still further object of the present invention is to provide a starter that can attain the foregoing objects and which is capable of being controlled automatically with no difficulty.

These and other objects together with the advantages of the present invention will become apparent by reading the following detailed description and embodiments in conjunction with the accompanying drawings.

BRIEF DESCRIPTION OF THE DRAWINGS

FIG. 2 through 27 are diagrammatic representations showing embodiments of various different types in which the present invention is applied to starting compensators for AC motors, in which:

FIG. 2 is a diagrammatic representation of a circuit embodying the present invention and showing only the one-phase portion of the three-phase circuit;

FIG. 3 is a circuitry diagram of the embodiment in FIG. 2;

FIG. 4 is a diagrammatic representation showing an example of the circuit in FIG. 3;

FIG. 5 is a diagrammatic representation of another example of the circuit in FIG. 3;

FIG. 6 is a diagrammatic representation of a circuit similar to that in FIG. 2 but showing another embodiment;

FIG. 7 is a circuit diagram showing an example of the circuit in FIG. 6;

FIG. 8 is a circuitry diagram showing another example of the circuit in FIG. 6;

FIG. 9 is a diagrammatic representation of a circuit similar to FIG. 2, showing still another embodiment of the present invention;

FIG. 10 is a diagrammatic representation of a circuit similar to the above, showing yet another embodiment of the present invention;

FIG. 11 is a diagrammatic representation of a circuit similar to the above, showing a further embodiment of the present invention;

FIG. 12 is a circuit diagram, showing an example of the circuit in FIG. 11;

FIG. 13 is a circuit diagram, showing another example of the circuit in FIG. 11;

FIG. 14 is a diagrammatic representation of a circuit similar to that in FIG. 2, showing a still further embodiment of the present invention;

FIG. 15 is a diagrammatic representation of a circuit similar to the above, showing a yet further embodiment of the present invention;

FIG. 16 is a diagrammatic representation of a circuit, showing still another embodiment of the present invention;

FIG. 17 is a circuit diagram, showing an example of the circuit illustrated in FIG. 16;

FIG. 18 is a circuit diagram, showing another example of the circuit in FIG. 16;

FIG. 19 is a diagrammatic representation of a circuit similar to that in FIG. 2, showing another embodiment of the present invention;

FIG. 20 is a circuit diagram, showing an example of the circuit in FIG. 19;

FIG. 21 is a circuit diagram, showing another example of the circuit in FIG. 19;

FIG. 22 through 27 are diagrammatic representations showing the embodiments of various different types in which the present invention is applied to reactor starters, in which;

FIG. 22 is a diagrammatic representation of a circuit embodying the present invention and showing only the one-phase portion of a single-phase or a three-phase circuit;

FIG. 23 is a circuit diagram, showing an example of the circuit in FIG. 22;

FIG. 24, is a circuit diagram, showing another example of the circuit in FIG. 22;

FIG. 25 is a diagrammatic representation of a circuit similar to that in FIG. 22, showing another embodiment of the present invention;

FIG. 26 is a circuit diagram, showing an example of the circuit in FIG. 25;

FIG. 27 is a circuit diagram, showing still another example of the circuit in FIG. 25;

DESCRIPTION OF THE PREFERRED EMBODIMENTS

Figure 1:
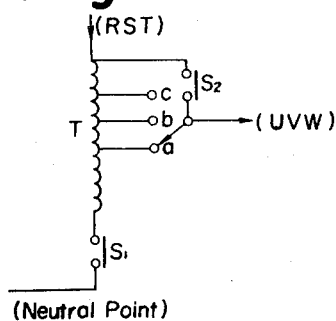
FIG. 1 is a diagrammatical representation of a circuit showing only the single-phase circuit or the one-phase portion of a three-phase circuit for use in the conventional starting compensator for AC motors.

FIG. 1 is a diagrammatic representation showing the principle of the one-phase portion of a three-phase circuit of a conventional starting compensator. In the drawings, $S_1$ represents a neutral point switch. $S_2$ represents a changeover switch for changing the connection over to the power source. T represents an autotransformer. Letters $a$, $b$ and $c$ represent starting voltage selecting terminals, respectively. As is well known, these selective terminals are operative in such a way that either one of the terminals $a$, $b$ and $c$ is selected for establishing connection to the motor and that at the time of starting the motor, the neutral switch $S_1$ is closed to reduce the applied voltage by virtue of the autotransformer T and that by opening the neutral point switch $S_1$ after an elevation of the rotation speed of the motor, and by simultaneously closing the changeover switch $S_2$, the motor is rendered to the normal operating state.

As has been discussed above, conventional starting compensators have the disadvantages and shortcomings such that they require large and expensive switches $S_1$ and $S_2$ having a capacitance identical with that of the power source switches, that there occur frequent losses and damages of the contacts and that a great deal of time and labor is required for the alteration of the connection of the selective terminals.

Figure 2:
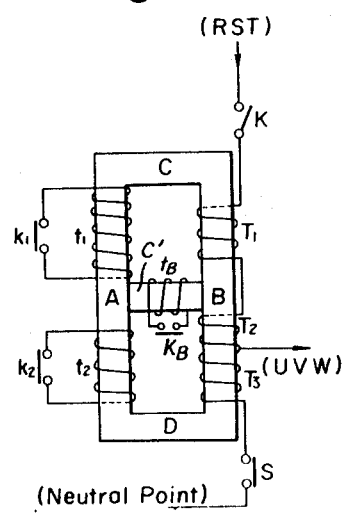
Figure 3:
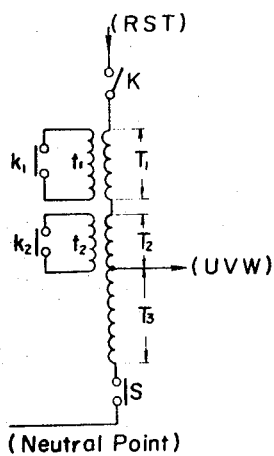

FIG. 2 and 3 are diagrammatic representations, illustrating the principle of one embodiment of the present invention. In the drawings, A–C–B–D–A represents a magnetic path comprising such a component as a laminated core. A–C'–B represents a bypass magnetic path for dividing said magnetic path into two magnetic paths, i.e. A–C–B–C'–A and A–C'–B–D–A. $T_1$, $T_2$ and $T_3$ represent windings connected in series and for use in the main circuit. $t_1$ and $t_2$ represent secondary windings consisting of independent circuits, respectively. S represents a neutral point switch. $k_1$ and $k_2$ represent switches for breaking and making said secondary windings $t_1$ and $t_2$. Winding $t_B$ is a flux leakage preventing winding whose operation will be later described in more detail. These components are arranged in such a way that said winding $T_1$ for the main circuit and secondary winding $t_1$ are wound around the magnetic path A–C–B–C'–A, while the windings $T_2$ and $T_3$ and the secondary winding $t_2$ are wound around the magnetic path A–C'–B–D–A, that the combination of said winding $T_1$ for the main circuit and the second winding $t_1$ and the combination of the winding $T_2$ for the main circuit and the secondary winding $t_2$ are arranged so as to have ampere-turns which are inverse to each other, that the mid point of the windings $T_2$ and $T_3$ for the main circuit is connected to the motor and that the terminal of $T_3$ is connected, via the neutral point, to the neutral point.

In the foregoing embodiment, when the neutral point switch S is closed simultaneously with the closing of the power switch K at the time the motor is started, the following voltage:

Power source voltage $\times (T_3/T_1+T_2+T_3)$ is applied to the motor, with the result that the motor is started under a reduced voltage. The magnetic flux then produced will constitute a magnetic circuit A–C–B–D–A.

When the switch $k_1$ of the secondary winding is subsequently closed, the magnetic flux which is generated by the winding $T_1$ for the main circuit is cancelled out to nil by the magnetic flux which is generated by the secondary winding $t_1$. As a result, the magnetic flux will constitute a magnetic circuit A–C'–B–A. Accordingly, the voltage which is applied to the motor will rise according to the following formula:

Power source voltage $\times (T_3/T_2+T_3)$ to thereby increase the torque of the motor.

After the rotation of the motor has been accelerated in the foregoing way, the neutral point switch S is opened while, on the other hand, the switch $k_2$ of the secondary winding is closed, Whereupon, the voltage drop caused by the main circuit winding $T_2$ is cancelled by the secondary winding $t_2$, and, as a result, a voltage which is identical in magnitude with the power source voltage will be applied to the motor, so that the motor will then be thrown into full voltage operation.

The switches $k_1$ and $k_2$ of the secondary windings for regulating the applied voltage in the present invention are inserted in the secondary winding circuits which are independent of the main circuit, and accordingly, this permits the use of a small size switches which can be operated under a low voltage. As a consequence, there can be used markedly compact and inexpensive switches in circuits for large current and/or high voltage operations, as compared with those switches required in such operations in the prior art.

Also, during the course of an increase in the rotation speed of the motor, it is possible to freely regulate the magnitude of the voltage supplied to the motor in the foregoing manners by the employment of the aforesaid arrangement.

Furthermore, according to the present invention, it is possible to start the motor under a voltage higher than the aforesaid starting voltage if the time delay of the switch $k_1$ is set at nil such that this switch $k_1$ is closed at substantially the same time the motor is started. In addition, by setting the time delay of the switches $k_1$ and $k_2$ both at nil, it is possible to start the motor under full voltage.

Figure 4:
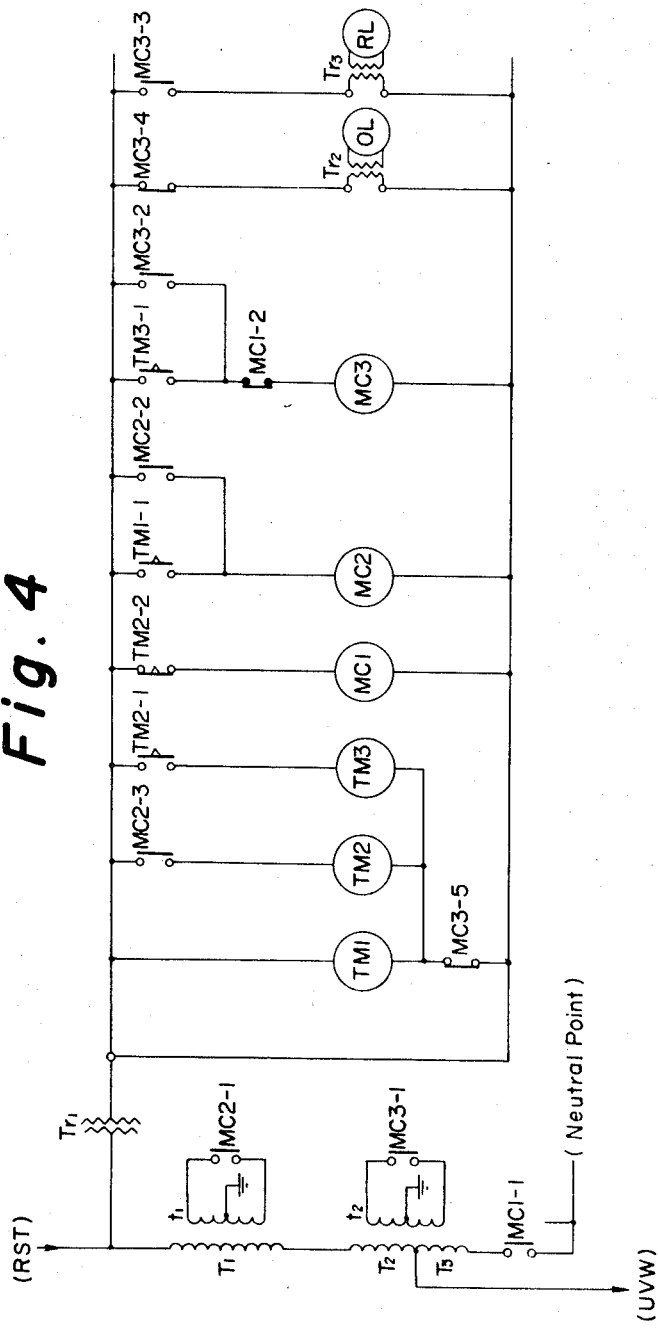
Figure 5:
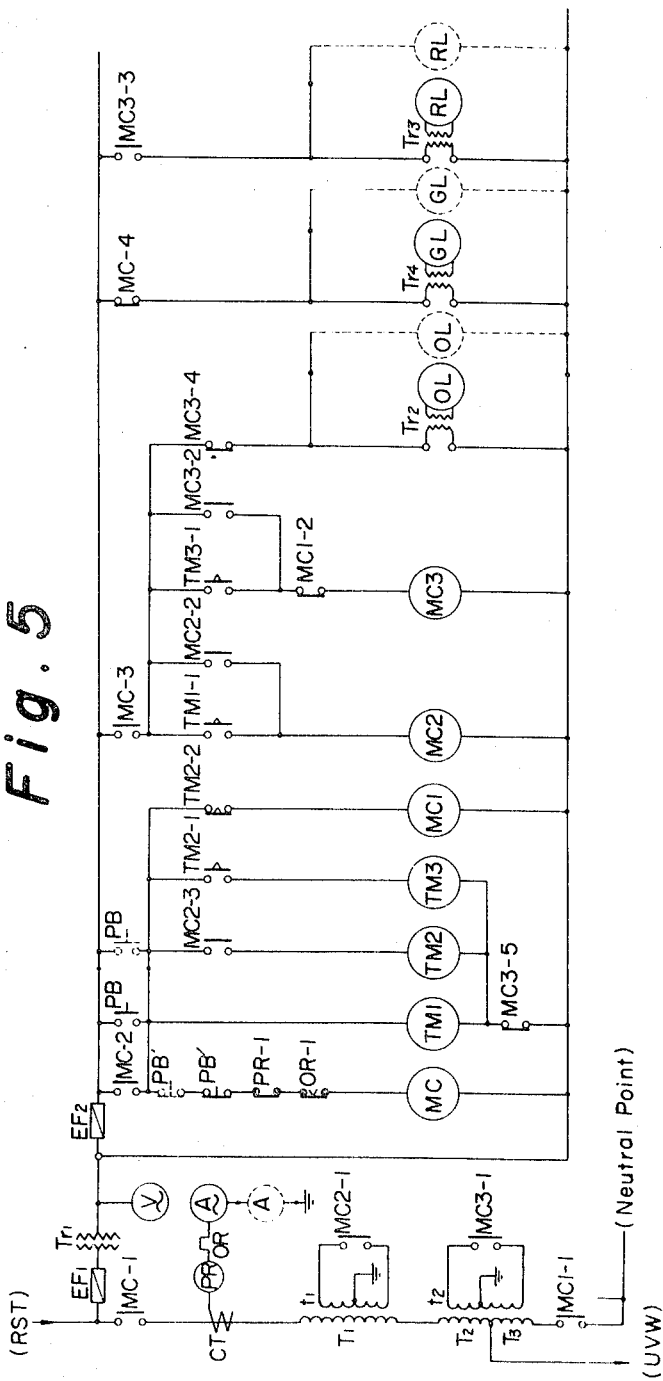

FIGS. 4 and 5 are connection diagrams showing examples in which the principle of the embodiment in FIGS. 2 and 3 is applied to actual starting compensators. These drawings each show only the one-phase portion of a three-phase circuit.

In FIG. 4, symbols $T_1$, $T_2$ and $T_3$ represent main circuit windings, respectively. Symbols $t_1$ and $t_2$ represent secondary windings. MC2-1 and MC3-1 represent the contact strips of electromagnetic contactors MC2 and MC3, respectively, corresponding to the switches $k_1$ and $k_2$ of the secondary windings shown in FIGS. 2 and 3. MC1-1 represents the contact strip of an electromagnetic contactor MC1, corresponding to the neutral point switch S shown in FIGS. 2 and 3. $Tr_1$ represents an operating transformer intended for dropping the power source voltage of 3300 v. to 220v. $Tr_2$ and $Tr_3$ represent transformers for indicator lamps and intended for dropping the operating voltage of 200 v. to 5v. which is the voltage to be applied to the indicator lamps. TM1, TM2 and TM3 represent time relays, respectively.

The aforesaid time relay TM1 is provided with a contact strip TM1-1 which is adapted to close with the arrival of the preset time (a contact strip of this type will hereinafter be referred to simply as the $a$-type contact strip). This contact strip is connected in series to the electromagnetic contactor MC2. The time relay TM2, on the other hand, is provided with an $a$-type contact strip TM2-1 and also with a contact strip TM2-2 which is adapted to open with the arrival of the preset time (a contact of this type will hereinafter be referred to simply as the $b$-type contact strip). The $a$-type contact strip TM2-1 of the time relay TM2 is connected in series to the time relay TM3, while the $b$-type contact strip TM2-2 is connected in series to the electromagnetic contactor MC1. The time relay TM3, in turn, is provided with an $a$-type contact strip TM3-1, and this contact strip is connected in series to the electromagnetic contactor MC3.

The electromagnetic contactor MC1 is provided with a contact strip MC1-1 which corresponds to the aforesaid neutral point switch S, and also with a contact strip MC1-2 which is normally closed and is adapted to be opened upon being energized (a contact strip of this type will hereinafter be referred to simply as the $b$-type contact strip). This contact strip MC1-2 of the electromagnetic contactor MC1 is connected in series to the electromagnetic contactor MC3. The electromagnetic contactor MC2 is provided with an aforesaid contact strip MC2-1 for the secondary winding, and also with contact strips MC2-2 and MC2-3 which are normally open and are adapted to be closed upon being energized (contact strips of this latter type will hereinafter be called as $a$-type contact strips). Of these latter two, the contact strip MC2-2 is used as the self-retaining contact, while the contact strip MC2-3 is connected in series to the time relay TM2. The electromagnetic contactor MC3 is provided with an aforesaid contact strip MC3-1 for the secondary winding, and also with $a$-type contacting strips MC3-2, MC3-3 and further with $b$-type contacting strips MC3-4, MC3-5. Of these contacting strips, MC3-2 is used as the self-retaining contact of this electromagnetic contactor, while the contact strips MC3-3 and MC3-4 are used as the changeover contacts for a red lamp RL and an orange lamp OL, and the contact strip MC3-5 is used as the resetting contact for all of the time relays.

In the example of FIG. 4, upon throwing-in of the power switch (not shown), the orange lamp OL is lighted up. Simultaneously therewith, the electromagnetic contactor MC1 is energized, and accordingly the contact strip MC1-1 is closed, thereby starting the motor under a reduced voltage. At the same time, the time relay TM1 begins to be actuated. Then, upon the arrival of the preset time of the time relay TM1, the $a$-type contact strip TM1-1 of this time relay is closed to energize the electromagnetic contactor MC2. Accordingly, the contact strip MC2-1 is closed to thereby accelerate the rotation speed of the motor, while the contact strip MC2-2 is closed for the self-retaining of the contactor while the contact strip MC2-3 is closed, with the result that the time relay TM2 begins to be actuated.

When the preset time of the time relay TM2 arrives after the rotation speed of the motor has been thus accelerated, the $a$-type contact strip TM2-1 of this time relay is closed to start the actuation of the time relay TM3. Simultaneously therewith, the $b$-type contact strip TM2-2 is opened to reset the electromagnetic contactor MC1, so that the contact strip MC1-1 is opened while on the other hand the contact strip MC1-2 is closed.

Thereafter, upon the arrival of the preset time of the relay TM3, its $a$-type contact strip TM3-1 is closed to energize the electromagnetic contactor MC3. Accordingly, the contact strip MC3-1 is closed to apply full voltage to the motor so that the motor is rendered to the state of full-voltage operation. At the same time, the contact strip MC3-2 is closed to effect self-retaining of the contactor while the contact strip MC3-5 is opened to reset all of the time relays, with the result that the contact strip MC3-3 is closed and the contact strip MC3-4 is opened to put out the orange lamp OL while lighting up the red lamp RL, thus indicating the fact that the motor has now been thrown into the normal operation.

The time relays TM1, TM2 and TM3 which are used in the foregoing embodiment are of such a type that permits the operating time of their contacts to be set freely as desired in accordance with the factors such as the type of the motor and the condition of the load applied; there are used, for example, such relays as will permit the operating time of their contacts to be set freely as desired within the range of from 0 to 60 seconds.

The foregoing embodiment is operative in such a way that when the power circuit is temporarily shut off from the power source, the entire circuits are instantaneously rendered to the state prior to the starting of the motor even where the power switch remains in its state of being thrown into the "on" state, and that, upon the resumption of the power supply, the motor is started again automatically and without any appreciable danger in the manner as has been described previously, and therefore, this embodiment is advantageous when used as the starting compensator for motors which are to be operated in the absence of an operator, for example, for the operations at night.

The example shown in FIG. 5 provides arrangement that the power switch is adapted to be also electromagnetically controlled of its keying action and further that this control means is associated with a short circuit protective relay and also with an overcurrent relay, so that the whole system can be operated automatically by only pressing on a pushbutton type switch.

In FIG. 5, MC represents a main electromagnetic contactor of the high voltage air circuit type. This electromagnetic contactor is equipped with a main circuit contact strip MC-1 which is adapted to close upon energization of said contactor, and with contact strips for the control circuits, i.e. $a$-type contact strips MC-2, MC-3 and a $b$-type contact strip MC-4. Of these contact strips, MC-2 is used as the self-retaining contact strip of the contactor and also as the contact strip for starting the action of the aforesaid control circuit. The contact strip MC-3 is connected to the circuits of the electromagnetic contactors MC2 and MC3 and also to the circuit of the orange lamp OL, while the contact strip MC-4 is connected, via the transformer $Tr_4$, to the circuit of the green lamp GL which is intended for indicating the connection of the power source. CT represents a current transformer which is provided in the main circuit. PR represents a short circuit protective relay. OR represents a thermal overcurrent relay. The $b$-type contact strips PR–1 and OR–1 of these two relays are both connected in series to the circuit of the main electromagnetic contactor MC. $EF_1$ represents a high voltage fuse. $EF_2$ represents a low voltage fuse. Symbol A represents an AC ammeter. V represents an AC voltmeter. PB represent a pushbutton type driving switch. PB′ represents a pushbutton type stopping switch. The circuit which is indicated by dotted lines in FIG. 5 represents one which is intended for the remote control operation or for vigilance. The rest of the arrangement is identical with that of the example shown in FIG. 4, and therefore, the description thereof is omitted.

In the example shown in FIG. 5, the operation may be carried out in the manner as follows. Upon application of a pressure on the pushbutton type throwing-in switch PB, the main electromagnetic contactor MC is energized, causing the main circuit contact strip MC–1 thereof to be closed. Simultaneously therewith, this is self-retained by the contact strip MC–2, while closing the contact strip MC–3 and opening the contact strip MC–4 to cause the orange lamp OL to be lighted on. Thereafter, in the same manner as that described in connection with the example of FIG. 4, the following operations are carried out automatically in the order: starting of the motor under a reduced voltage → acceleration → full voltage operation. In the event that a short circuit takes place, this will be instantly followed by the actuation of the short circuit protective relay PR to cut off the entire circuits. On the other hand, in case elevation of the temperature exceeds a certain level owing to the reasons such as overload of the motor, the thermal overcurrent relay OR will be actuated to cut off the entire circuits.

Figure 6:
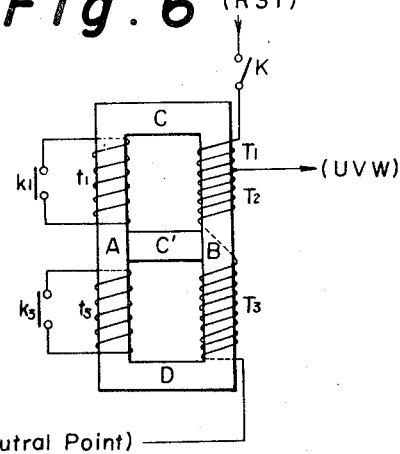

FIG. 6 illustrates another embodiment of the starting compensator which does not require the provision of a neutral point switch. A–C–B–D–A represents an endless magnetic path which is made with a laminated iron core or the like. A–C′–B represents a bypass magnetic path. $T_1$, $T_2$ and $T_3$ represent main circuit windings which are connected in series. $t_1$ and $t_3$ represent secondary windings consisting of independent circuits, respectively, with respect to the main circuit. $k_1$ and $k_3$ represent the keying switches of the aforesaid secondary windings $t_1$ and $t_3$, respectively. The main circuit windings $T_1$ and $T_2$ and the secondary winding $t_1$ are provided around the magnetic path section A–C–B–C′–A which is so sectioned by the interposition of the bypass magnetic path A–C′–B. On the other hand, the main circuit winding $T_3$ and the secondary winding $t_3$ are wound around the other magnetic path section A–C′–B–D–A. The main circuit winding $T_1$ and the secondary $t_1$ are arranged so that the latter has inverse but equivalent ampere turns relative to the former, and likewise, the main circuit winding $T_3$ and the secondary winding $t_3$ are arranged so that the latter has inverse but equivalent ampere turns relative to the former. The mid point of the two main circuit windings $T_1$ and $T_2$ is connected to the motor and the terminal of the main circuit winding $T_3$ is connected directly to the neutral point.

Now, let us assume that, in order to start the motor, the power switch K is closed and simultaneously therewith the switch $k_3$ of the secondary winding $t_3$ is closed also. Then, the following voltage, i.e.

Power source voltage $(T_2/T_1+T_2)$ is applied to the motor, and, accordingly, the later is started under a reduced voltage. The magnetic flux then produced constitutes the magnetic path A–C–B–C′–A.

Next, when it is intended to increase the torque required for the load, the switch $k_3$ of the secondary winding $t_3$ is opened. Whereupon, the voltage which is applied to the motor will rise, taking the value of:

Power source voltage × $(T_2+T_3/T_1+T_2+T_3)$ As a result, the torque of the motor is increased. The magnetic flux produced in this stage constitutes the magnetic path A–C–B–D–A.

Next, when the switch $k_1$ of the secondary winding $t_1$ is closed after the acceleration of the motor speed has been effected in the foregoing way, the reactance due to the main circuit winding $T_1$ is removed, with the result that full voltage is applied to the motor, and the latter is rendered to the state of full voltage operation. The magnetic flux in this stage will constitute the magnetic path A–C′–B–D–A.

In the aforesaid embodiment, the starting of the motor is effected by the use of the main circuit windings $T_1$ and $T_2$. For the acceleration of the motor, all of the main circuit windings $T_1$, $T_2$ and $T_3$ are used. In the full-voltage operating period, the main circuit winding $T_3$ is used. However, by the provision of the following condition: $T_1+T_2<T_2+T_3 \cdot T_1<T_3$, it is possible to greatly reduce the flux density produced during the full-voltage operating time as compared with that produced at the time the motor is started. Accordingly, it is possible to suppress the reactive current during the operation of the starting compensator to 1/20∼1/40, and also to reduce the power loss to a very small value.

For the above reasons, there is no need for opening the neutral point of the circuit during the operation, and thus, it is possible to obtain a quite advantageous starting compensator which is free of the neutral point switch and which is quite compact, light in weight and low in cost as compared with the conventional starting compensators and which permits the aforesaid multistage voltage starting to be performed.

In this embodiment also, the secondary winding switches $k_1$ and $k_3$ can employ compact and low voltage switches as desired, simply by selecting the $T_1$ vs. $t_1$ or $T_3$ vs. $t_3$ winding turn ratio. Accordingly, this is quite advantageous as compared with the conventional main circuit changeover switches. These compact low voltage switches can be utilized quite economically especially when used in starting machines with large current.

Figure 7:
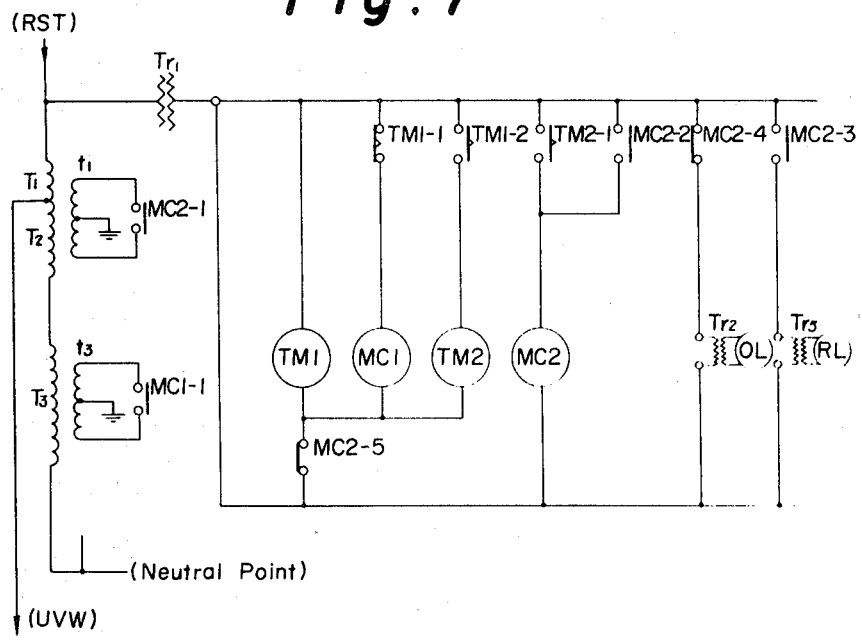
Figure 8:
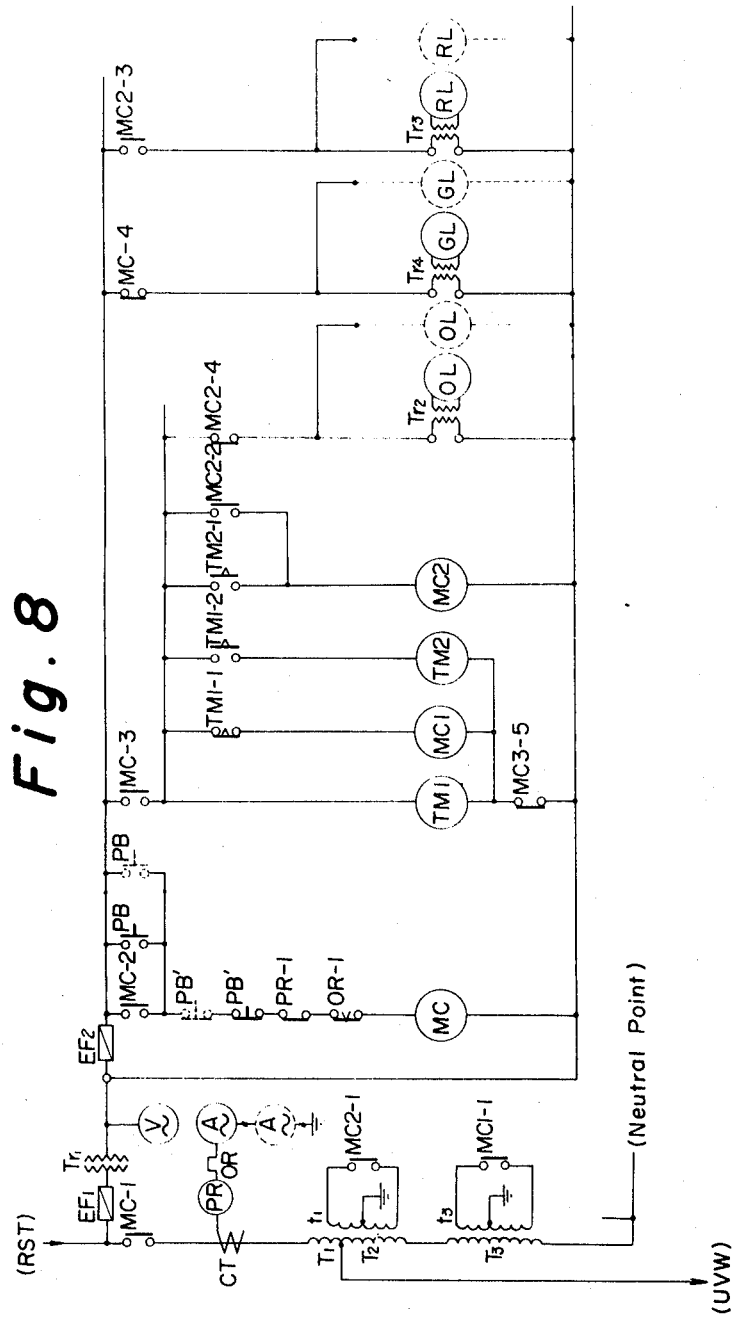

FIGS. 7 and 8 are examples of circuitry for the embodiment shown in FIG. 6.

In FIG. 7, $T_1$, $T_2$ and $T_3$ represent main circuit windings which are connected in series. $t_1$ and $t_3$ represent secondary windings which are comprised of independent circuits, respectively. MC1–1 represents a contact strip of an electromagnetic contactor MC1, and it corresponds to the aforesaid switch $k_3$. MC2–1 represents a contact strip of an electromagnetic contactor MC2, and it corresponds to the aforesaid switch $k_1$. TM1 and TM2 represent time relays which can be set freely as desired within the range of from 0 to 180 seconds. $Tr_1$ represents a transformer intended for dropping the power source voltage of 3,300 v. to the operating voltage of 220v. $Tr_1$ and $Tr_3$ represent transformers for dropping the operating voltage of 220 v. to the indicator lamp voltage of 5v. OL represents an orange lamp for indicating that the motor is in its stage of being started. RL represents a red lamp for indicating that the motor is in normal operation.

The aforesaid time relay TM1 is provided with a $b$-type contact strip TM1–1 and an $a$-type contact strip TM1–2. Of these contact strips, TM1–1 is connected in series to the electromagnetic contactor MC1, while the contact strip TM1–2 is connected in series to the time relay TM2. On the other hand, the time relay TM2 is of an $a$-type contact strip TM2–1 which, in turn, is connected in series to the electromagnetic contactor MC2. The electromagnetic contactor MC2 is provided with the aforesaid contact strip MC2–1, $a$-type contact strips MC2–2, MC2–3 and $b$-type contact strips MC2–4, MC2–5. Of these contact strips, MC2–2 is used as the self-retaining contact strip of the contactor MC2, while MC2–3 and MC2–4 are used as the changeover contact strips for effecting the switching-over between the red lamp RL and the orange lamp OL. Also, MC2–5 is connected in such a way as to have it serve as the contact strip for resetting the time relays TM1 and TM2 as well as the electromagnetic contactor MC1.

In the aforesaid embodiment, when the power switch (not shown) is closed, the contact strip MC1–1 is closed upon the energization of the electromagnetic contactor MC1, and thus the motor is started. At the same time, the time relay TM1 begins to be driven. Upon the arrival of the preset time of said time relay, the contact strip TM1-1 is opened to cause the electromagnetic contactor MC1 to be reset so as to elevate the voltage applied to the motor. Simultaneously therewith, the time relay TM2 begins to be driven. Then, upon the arrival of the preset time of this time relay TM2, its contact strip TM2-1 is closed to energize the electromagnetic contactor MC2, so that the contact strip MC2-1 is closed to apply full voltage to the motor, rendering the motor to the full-voltage operating state. This state is self-retained by the action of the contact strip MC2-2, while, on the other hand, the contact strip MC2-5 is opened to reset the time relays TM1 and TM2, and along with this, the connections of the contact strips MC2-3 and MC2-4 are changed over to put out the orange lamp and light up the red lamp to thereby indicate that the motor is in normal operation.

FIG. 8 provides a system in which means is provided so that the opening and closing of the power switch also can be electromagnetic controlled, and in which this power switch control means is associated with a short circuit protective relay and with an overcurrent relay so that automatic operation is obtained by a mere depression of the pushbutton type switch.

In FIG. 8, MC represents a main electromagnetic contactor of the high voltage, air-immersed type. This electromagnetic contactor is provided with a main circuit contact strip MC-1 which is adapted to be closed upon energization of said contactor, $a$-type contact strips MC-2, MC-3 and a $b$-type contact strip MC-4. Of these contact strips, MC-2 is used to serve, jointly, as the self-retaining contact and at the same time as the contact strip for starting the action of the control circuit. On the other hand, MC-3 is connected in series to time relays TM1 and TM2, and also to the electromagnetic contactors MC1 and MC2, and further to the circuit of the orange lamp OL. Furthermore, MC-4 is connected, via a transformer $Tr_4$, to the circuit of the green lamp GL intended for indicating the connection of the power source. CT represents a current transformer which is provided in the main circuit PR represents a short circuit protective relay. OR represents a thermal overcurrent relay. The contact strips PR-1 and OR-1 of these two relays are connected in series to the aforesaid main electromagnetic contactor MC. $EF_1$ represents a high voltage fuse. $EF_2$ represents a low voltage fuse. Symbol A represents an AC ammeter. V represents an AC voltmeter. PB represents a driving pushbutton switch. PB' represents a stopping pushbutton switch. The circuits indicated by broken lines in FIG. 8 are those for either the remote control operation or the vigilance. The rest of the arrangement is identical with that shown in FIG. 7, and therefore, the explanation thereof is omitted.

In the example shown in FIG. 8, when the pushbutton switch PB is depressed, the main electromagnetic contactor MC is energized to close its main circuit contact strip MC-1 and simultaneously therewith, said contactor effects self-retaining by the action of its contact strip MC-2, and on the other hand, the contact strip MC-3 is closed while the contact strip MC-4 is opened to light up the orange lamp OL. Thereafter, in the manner similar to that described in connection with the example in FIG. 7, the following series of actions, i.e. starting of the motor under a reduced voltage → acceleration → full voltage operation, can be effected automatically. Upon the depression of the pushbutton switch PB', all members of the system cease their actions. In the event that a short circuit breaks out, the short circuit protective relay PR is immediately actuated to cut off the entire circuits. Also, when the elevation of the temperature of the system exceeds a certain level due to reasons such as overload, the thermal overcurrent relay OR is actuated to cut off the entire circuits.

Figure 9:
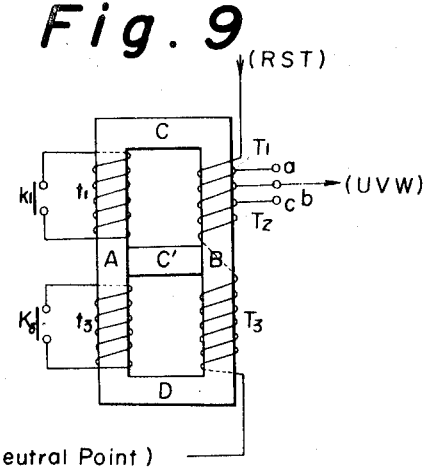

FIG. 9 provides an embodiment in which there are provided a plurality of selective terminals $a$, $b$ and $c$ between the main circuit windings $T_1$ and $T_2$ of the starting compensator shown in FIG. 6, so as to be operative in such a way that, by switching over the terminals connected to the motor, the ampere turn ratio between the main circuit windings $T_1$ and $T_2$ is altered to thereby alter the voltage under which the starting of the motor is to be performed.

Figure 10:
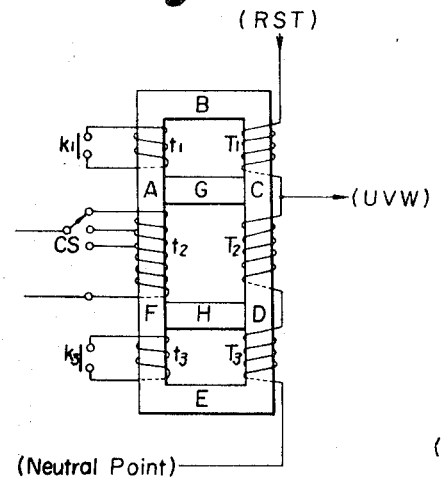

FIG. 10 illustrates an embodiment in which the fact that a magnetic flux is produced in magnetic paths is utilized in obtaining the power for operating the secondary winding switches $k_1$, $k_3$ and other switches, in such a manner as will be described hereunder.

In FIG. 10, A-B-C-D-E-F-A represents an endless magnetic path. A-G-C and F-H-D represent bypass magnetic paths, respectively. A main circuit winding $T_1$ is provided between B-C, another main circuit winding $T_2$ between C-D, and still another main circuit winding $T_3$ between D-E, in continuous fashion. A secondary winding $t_1$ is provided between B-A and another secondary winding $t_3$ between E-F. Also, a winding $t_2$ for the operating power source is provided between F-A. This winding $t_2$ is connected, via a terminal changeover switch CS, to the operating circuit.

By the provision of the foregoing arrangement, a magnetic flux is always produced in the magnetic path F-A irrespective of whether during the starting period, the accelerating period, or the operating period. Therefore, an electromotive force is produced in the secondary winding $t_2$. Accordingly, it is possible to operate the secondary winding switches $k_1$, $k_3$ or the like without the use of any other power source and an operating transformer.

In case the secondary switches $k_1$ and $k_2$ are opened to use the magnetic path A-C-B-D-A as the magnetic circuit in the examples of FIGS. 3 through 5, or in case the secondary switches $k_1$ and $k_3$ are opened to use the magnetic path A-C-B-BD-A as the magnetic circuit in the embodiment and examples of FIGS. 6 through 9, a part of the magnetic flux will leaks into the bypass magnetic path A-C'-B. Therefore, the voltage which is actually applied to the motor will be:

Power source voltage × $(T_3/T_1+T_2+T_3)$ × $\alpha$ (for the instances of FIGS. 3 to 5), or Power source voltage × $(T_a+T_3/T_1+T_2+T_3)$ × $\alpha$ (for the instances of FIGS. 6 to 9) (wherein: $\alpha$ represents magnetic flux leakage coefficient, which varies with the factors such as the flux density of the magnetic path, or the construction materials employed.)

Figure 11:
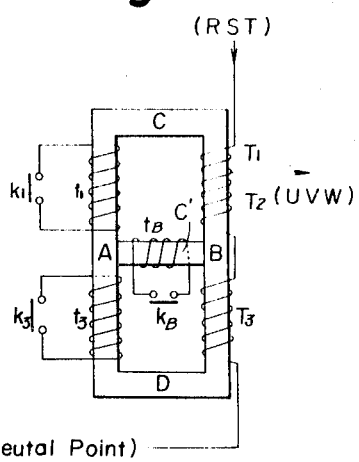

FIG. 11 illustrates an embodiment which is arranged so as to obviate the aforesaid leakage of magnetic flux. In this embodiment, the bypass magnetic path A-C'-B is provided with a magnetic flux leakage preventing winding $t_B$ which is provided therearound. The switch $k_B$ of the aforesaid winding $t_B$ is closed only when the magnetic circuit A-C-B-D-A is used, with all of the secondary winding circuits being opened, so that the leakage of the magnetic flux to the bypass magnetic path A-C'-B may be prevented by means of said winding $T_B$. Accordingly, this magnetic flux leakage preventing winding $t_B$ employs such a one that can produce a magnetic flux which is inverse in direction to the leaking magnetic flux and which is of a value sufficient for cancelling the leaking magnetic flux out.

Hereunder is mentioned the state, i.e. open or closed, of the respective switches during the entire course of operation, i.e. starting — acceleration — normal operation, of the embodiment shown in FIG. 11:

| | Starting | Acceleration | Operation |
|---|---|---|---|
| Switch $k_1$ | Open | Open | Closed |
| Switch $k_3$ | Closed | Open | open |
| Switch $k_B$ | Open | Closed | Open |

As should now be apparent, the flux leakage preventing winding is utilized in a similar manner in the circuit of FIG. 2 so that the circuit of this winding is closed only when the associated bypass magnetic path is not used to thereby prevent the unwanted leakage of magnetic flux through said bypass path. For instance, where there is only one bypass path and two secondary windings (as in FIG. 2), the flux preventing winding would be closed only when both the secondary windings are open circuited. This is, of course, the same as described above with respect to the embodiment of FIG. 11.

Figure 12:
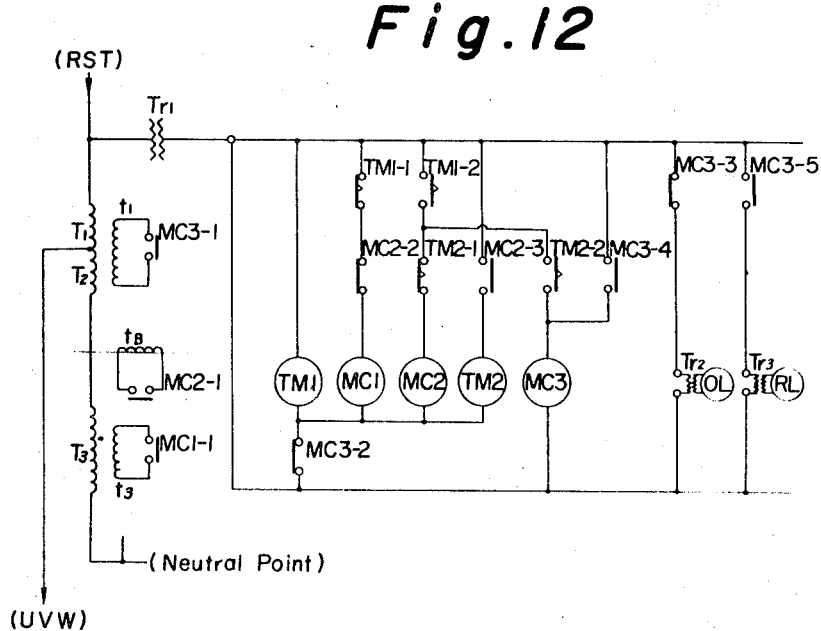

FIG. 12 is a connection diagram, showing an example of the embodiment of FIG. 11. In FIG. 12, MC1-1 represents a contact strip of an electromagnetic contactor MC1, corresponding to the secondary winding switch $k_3$ in FIG. 11. MC2-1 represents a contact strip of an electromagnetic contactor MC2, corresponding to the switch $k_B$ in FIG. 11. MC3-1 represents a contact strip of an electromagnetic contactor MC3, corresponding to the switch $k_1$ in FIG. 11. TM1 and TM2 represent time relays which are such that the time can be set as desired within the range of from 0 to 180 seconds. $Tr_1$ represents a transformer for dropping the power source voltage of 3300 v. to the operating voltage of 220v. $Tr_2$ and $Tr_3$ represent transformers for indicator lamps, and they are assigned for dropping the voltage of 220 v. to 5v. OL represents an orange lamp. RL represents a red lamp.

The aforesaid time relay TM1 is of a $b$-type contact strip TM1-1 and an $a$-type contact strip TM1-2. Of these contact strips, TM1-is connected in series to the electromagnetic contactor MC1, while TM1-2 is connected in series to the electromagnetic contactor MC2. The time relay TM2, on the other hand, is of a $b$-type contact strip TM2-1 and an $a$-type contact strip TM2-2. Of these contact strips, TM2-1 is connected in series, together with the contact strip TM1-2 of the time relay TM1, to the circuit of the electromagnetic contactor MC2, while the contact strip TM2-2 is connected in series together with the contact strip TM1-2 of the time relay TM1, to the circuit of the electromagnetic contactor MC3.

The electromagnetic contactor MC2 is provided with the aforesaid contact strip MC2-1, a $b$-type contact strip MC2-2 and an $a$-type contact strip MC2-3. Of these contact strips, MC2-2 is connected in series, together with the contact strip TM1-1 of the time relay TM1, to the electromagnetic contactor MC1, while the contact strip MC2-3 is connected in series to the circuit of the time relay TM2. The electromagnetic contactor MC3, on the other hand, is of the aforesaid contact strip MC3-1, $b$-type contact strips MC3-2, MC3-3 and $a$-type contact strips MC3-4, MC3-5. Of these contact strips, MC3-2 is used as the contact for the resetting of the time relays TM1, TM2 and also of the electromagnetic contactors MC1 and MC2, while the contact strip MC3-4 is used as the self-retaining contact strip of the contactor MC3. The contact strips MC3-3 and MC3-5 are used as the contact strips for effecting the changing-over of the connection between the orange lamp OL and the red lamp RL.

In FIG. 12, let us now assume that the power switch (not shown) is closed. Whereupon, the electromagnetic contactor MC1 is actuated to close its contact strip MC1-1 to effect the starting of the motor. Simultaneously with this, the time relay TM1 begins to be driven. Upon the arrival of the preset time of this time relay TM1, the contact strip TM1-1 of this time relay is opened, and at the same time, the contact strip TM1-2 is closed. As a result, the electromagnetic contactor MC1 is deenergized to open its contact strip MC1-1 and thereby the motor is thrown into the acceleration state. Along with this, the electromagnetic contactor MC2 is energized by the action of its contact strip TM1-2 to close its contact strip MC2-1, to thereby prevent the leakage of the magnetic flux resulting from the bypass magnetic path, and also to close the contact strip MC2-3 to begin the driving of the time relay TM2.

Upon the arrival of the preset time of the time relay TM2 after the rotation speed of the motor has thus been accelerated, the contact strip TM2-1 of this time relay is opened to deenergize the electromagnetic contactor MC2, and along with this, the contact strip TM2-2 is closed to energize the electromagnetic contactor MC3. As a result, the contact strip MC2-1 is opened, and simultaneously therewith, the contact strip MC3-1 is closed to render the motor to its full voltage operation. At this moment, the electromagnetic contactor MC3 closes its contact MC3-4 and this is self-retained, and also it opens its contact strips MC3-2 to reset the time relays TM1, TM2 and also the electromagnetic contactors MC1 and MC2, while opening the contact strip MC3-3 and closing MC3-5 to light up the red lamp RL to indicate that the motor has been rendered to its normal operation.

Figure 13:
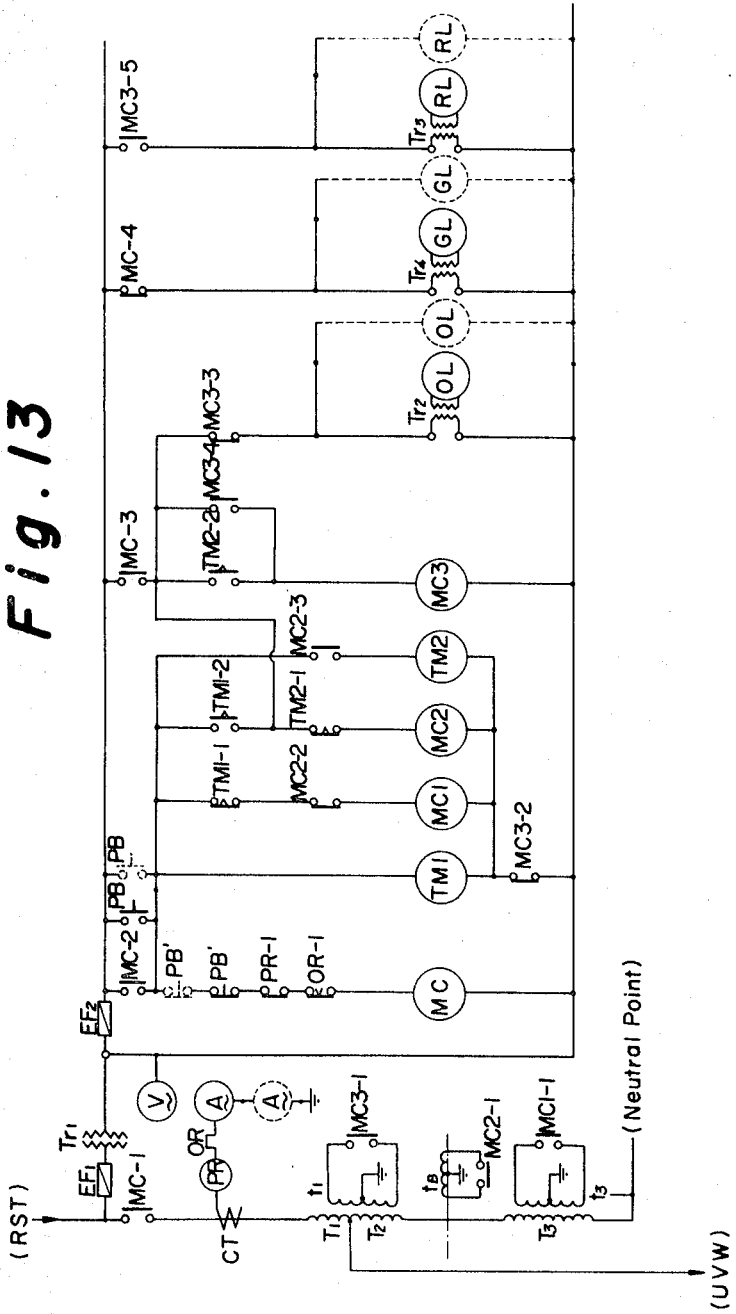

FIG. 13 provides an arrangement which is similar to that shown in FIG. 12 in basic principle, with the exception that the power switch is also adapted to be electromagnetically controlled of its keying action and that this control means is combined with a short circuit protective relay and an overcurrent relay, so that an automatic operation may be effected by merely depressing a pushbutton switch.

In FIG. 13, MC represents an electromagnetic contactor of the high voltage, air-immersed type. This electromagnetic contactor is of a main circuit contact strip MC-1, $a$-type contact MC. MC-2 and MC-3 for the control circuits, and a $b$-type contact strip MC-4. Of these contact strips, MC-2 is used as the self-retaining contact strip and also as the contact strip for starting the action of the control circuit. MC-3, on the other hand, is connected to the circuits of the electromagnetic contactors MC2 and MC3 and also to the circuit of the orange lamp OL. MC-4 is connected, via a transformer $Tr_4$, to the circuit of the green lamp GL which is intended for indicating the connection of the power source. CT represents a current transformer which is provided in the main circuit. PR represents a short circuit protective relay. OR represents a thermal overcurrent relay. The contact strips PR-1 and OR-1 of these two relays are connected in series to said main electromagnetic contactor MC. $EF_1$ represents a high voltage fuse. $EF_2$ represents a low voltage fuse. Symbol A represents an AC ammeter. V represents an AC voltmeter. PB represents a driving pushbutton switch. PB' represents a stopping pushbutton switch. The circuits indicated by broken lines in FIG. 13 are those intended either for the remote control operation or for the vigilance. The remainder of the arrangement is identical with that shown in FIG. 12, and therefore, its explanation is omitted.

In the embodiment shown in FIG. 13, upon the depression of the pushbutton switch PB, the main electromagnetic contactor MC is energized and its main circuit contact strip MC-1 is closed, and at the same time, the contact strip MC-2 is closed to effect self-retaining. Along with this, MC-3 is closed while the contact strip MC-4 is opened to light up the orange lamp OL. Thereafter, in the manner similar to that described in connection with the example shown in FIG. 12, an automatic operation is effected in the following order: starting → acceleration → full voltage operation. The operation can be brought to a halt upon the depression of the pushbutton switch PB'. In the event that a short circuiting takes place or that the elevation of the temperature in the system exceeds a predetermined value, the protective relay or the overcurrent relay will instantly be actuated to cut off the entire circuits.

FIGS. 14 through 21 show further circuitry embodiments and connection examples of the starting compensator embodying the present invention which are suitable for the applications of a low voltage, say for example, up to about 400 volts. These drawings each represents one-phase portion of a three-phase circuit of a starting compensator.

Figure 14:
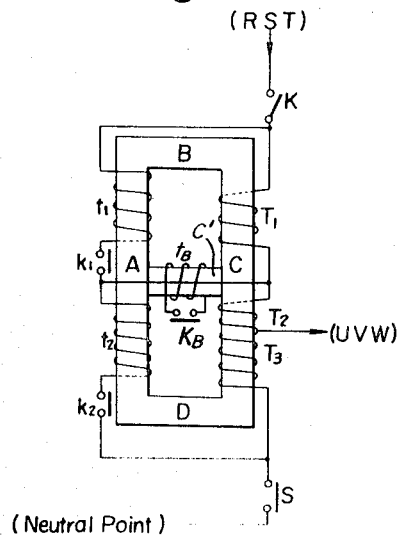

FIG. 14 shows one of such circuitries. This circuit is similar to that shown in FIG. 2 in basic principle, but it is different therefrom in arrangement in such a way that the secondary windings $t_1$ and $t_2$ thereof are connected, in parallel with the main circuit windings $T_1$ and $T_2$, to the main circuit so as to be operative in such a fashion that, when the secondary winding switches $k_1$ and $k_2$ are closed, the primary and the secondary windings will share the current I which flows through the main circuit. The flux preventing winding $t_B$ is utilized as previously discussed.

In this embodiment, a sequential operation, i.e. starting under a reduced voltage → acceleration → full voltage operation, may be performed in exactly the same way as that described in connection with the embodiment of FIG. 2. In view of the fact, however, that a part of the main circuit current flows through the secondary winding switches $k_1$ and $k_2$ for the reasons stated above, there may be suspected the wear of the contacts However, even when $t_1=T_1$ or $t_2=T_2$, the magnitude of the current that flows through each of the switches $k_1$ and $k_2$ will be one-half I, and the wear of the contacts will be represented by $KI^2$ (wherein: K represents a constant which is determined by the material with which the contacts are made). Therefore, the service life of these switches $k_1$ and $k_2$ in the instance in which $t_1=T_1$ or $t_2=T_2$ may be prolonged to four times that of the instance in which the entire main circuit current is allowed to flow through the switches $k_1$ and $k_2$. In actual operation, the service lives of these switches can be prolonged further by an appropriate selection of the winding ratio of the main circuit windings and the secondary windings. For the foregoing reasons, these switches $k_1$ and $k_2$ are sufficient for use in low voltage applications.

Figure 15:
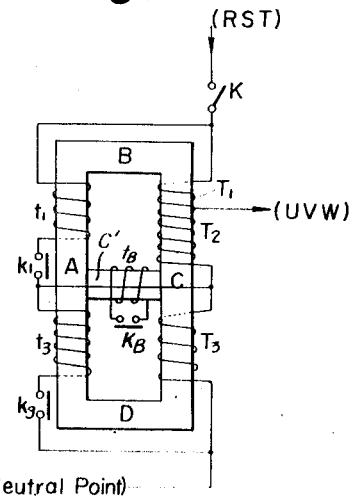

FIG. 15 shows a circuit diagram of a starting compensator for low voltage application which requires no neutral point switch. This circuit is similar in principle to that of the starting compensator shown in FIG. 6. The only difference lies in that the secondary windings $t_1$ and $t_3$ are connected, in parallel with the main circuit windings $T_1$ and $T_3$, to the main circuit, as in the instance of FIG. 14.

It will be understood without the need of explanation that a sequential operation, i.e. starting under a reduced voltage → acceleration → full voltage operation, can be effected by this embodiment in the same manner as is done by the circuit shown in FIG. 6, and also that the wear of the contacts of this embodiment is negligibly small as in the instance shown in FIG. 14.

Figure 16:
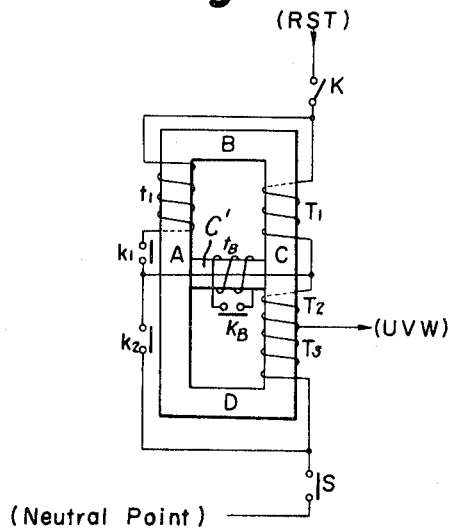

FIG. 16 shows a circuit diagram which is a modification of that of FIG. 14. This embodiment is basically similar to that of FIG. 14, with the exception that the main circuit windings $T_2$ and $T_3$ are of ampere turns which are equivalent to each other and that the secondary winding $t_2$ is omitted.

In this embodiment, when the neutral point switch S is closed simultaneously with the closing of the power switch K, there is applied to the motor the following voltage, i.e.:

Power source voltage $\times (T_3/T_1+T_2+T_3)$ and, thus, the motor is started under the reduced voltage. When, subsequently, the secondary winding switch $k_1$ is closed, there is applied to the motor the following voltage, i.e.:

Power source voltage $\times (T_3/T_2+T_3)$ and the rotation speed of the motor is accelerated. Finally, by closing the switch $k_2$ at the same time as the neutral point switch S is opened, the voltage drop which is effected by the main circuit windings $T_2$ and $T_3$ are cancelled out by each other since the direction in which the current flows through the main circuit winding $T_2$ is the reverse of that of the current flowing through the main circuit winding $T_3$, and thus, the motor can be put into full voltage operation.

Figure 17:
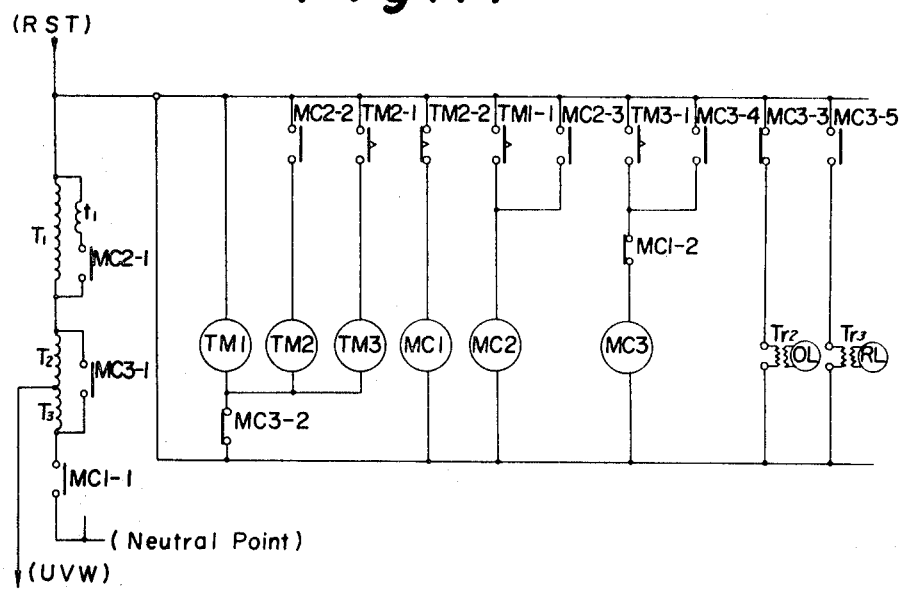

FIG. 17 shows an example of the connection of the circuit of FIG. 16. In this drawing, $T_1$, $T_2$ and $T_3$ represent main circuit windings which are connected in series to the power source. Symbol $t_1$ represents a secondary winding which is connected, in parallel with said main circuit winding $T_1$, to the power source. MC1-1 represents a contact strip corresponding to the neutral point switch S in FIG. 16. MC2-1 represents a contact strip corresponding to the switch $k_1$ in FIG. 16. MC3-1 represents a contact strip which corresponds to the switch $k_2$ in FIG. 16. TM1, TM2 and TM3 represent time relays, respectively.

Said time relay TM1 is provided with an a-type contact strip TM1-1 which, in turn, is connected in series with an electromagnetic contactor MC2. The time relay TM2 is provided with an a-type contact strip TM2-1 and a b-type contact strip TM2-2. Of these two, the contact strip TM2-1 is connected in series with the time relay TM3, while on the other hand, the contact strip TM2-2 is connected in series with an electromagnetic contactor MC1. The time relay TM3 is provided with an a-type contact strip TM3-1 which, in turn, is connected in series with an electromagnetic contactor MC3.

The electromagnetic contactor MC1 is provided with said contact strip MC1-1 which corresponds to the aforesaid neutral point switch and also with a b-type contact strip MC1-2. Of these two, the contact strip MC1-2 is connected in series with the electromagnetic contactor MC3. The electromagnetic contactor MC2, on the other hand, is provided with the aforesaid contact strip MC2-1, and a a-type contact strips MC2-2 and MC2-3. Of these three, MC2-2 is connected in series with the time relay TM2, while on the other hand, the contact strip MC2-3 is connected, in parallel with the time relay contact strip TM1-1, to the electromagnetic contactor MC2. The electromagnetic contactor MC3 is provided with the aforesaid contact strip MC3-1, b-type contact strips MC3-2, MC3-3, and a-type contact strips MC3-4, MC3-5. Of these five contact strips, MC3-2 is used as the resetting contact strip for all of the time relays, while on the other hand, MC3-4 is used as the self-retaining contact strip. The contact strips MC3-3 and MC3-5 are used as the switching-over contact strips for the orange lamp OL and the red lamp RL, via transformers $Tr_2$ and $Tr_3$.

In FIG. 17, when a power switch (not shown) is closed, the electromagnetic contactor MC1 is energized, with the result that the contact strip MC1-1 thereof is closed to start the motor under a reduced voltage. Simultaneously therewith, the time relay TM1 begins to be driven. Thereafter, upon arrival of the preset time of the time relay TM1, the contact strip TM1-1 thereof is closed to energize the electromagnetic contactor MC2. As a result, its contact strip MC2-1 is closed to elevate the voltage applied to the motor. Along with this, the contact strip MC2-2 is closed to begin the actuation of the time relay TM2, and this condition of the electromagnetic contactor MC2 is self-retained by means of the contact strip MC2-3. Thus, the rotation speed of the motor is increased. Upon the arrival of the preset time of the time relay TM2, the contact strip TM2-1 thereof is closed to begin the actuation of the time relay TM3. Along with this, the contact strip TM2-2 is opened to reset the electromagnetic contactor MC1, and the contact strip MC1-1 which corresponds to the neutral point switch is opened, while on the other hand, the contact strip MC1-2 is closed. Thereafter, when the preset time of the time relay TM3 arrives, the contact strip TM3-1 thereof is closed to energize the electromagnetic contactor MC3, and this condition is self-retained by the contact strip MC3-4. At the same time, the contact strip MC3-1 is closed to enter into the full voltage operation. Simultaneously therewith, the contact strip MC3-2 is opened to reset all of the time relays, and in addition, the contact strip MC3-3 is opened and the contact strip MC3-5 is closed to light up the red lamp, indicating that the motor is in normal operation.

Figure 18:
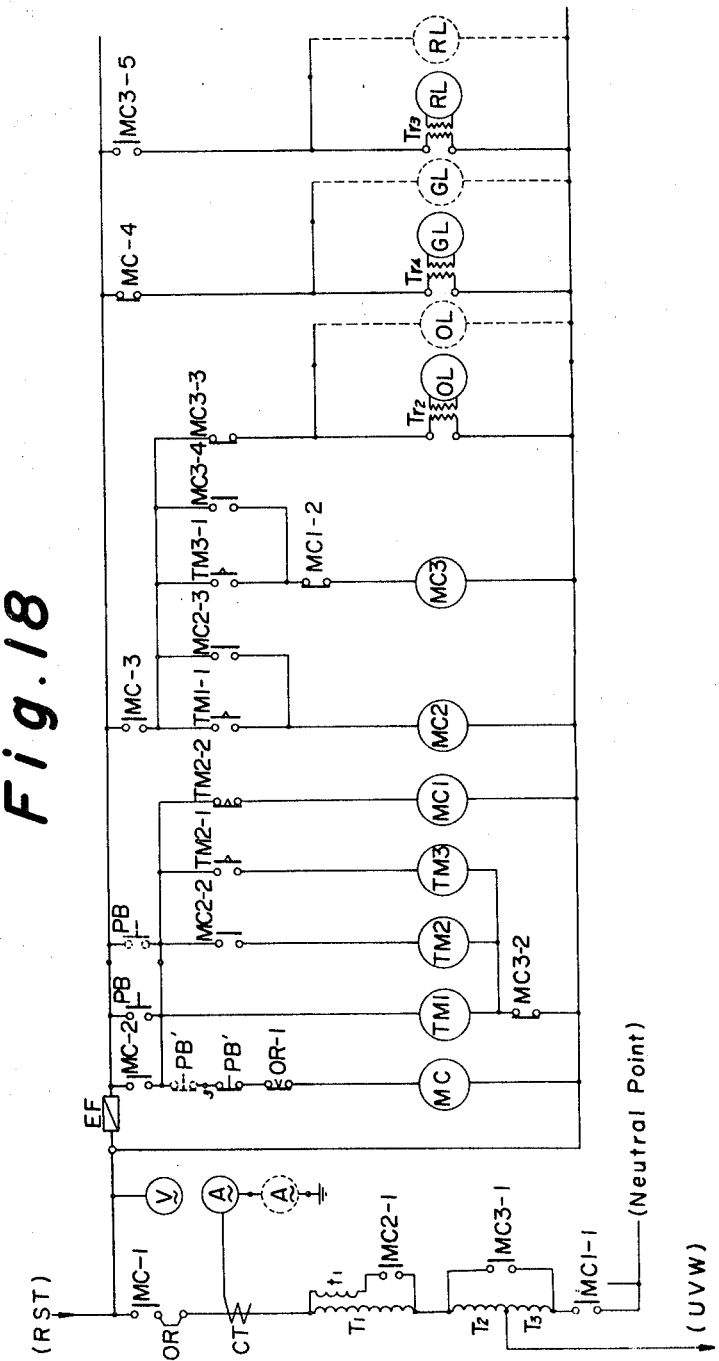

FIG. 18 shows a connection diagram which is similar to that of FIG. 17, with the exception that the power switch is arranged so as to be controlled electromagnetically, and that an overcurrent relay is combined therewith, so that the apparatus can be automatically operated by merely depressing the pushbutton switch.

In FIG. 18, MC represents a main electromagnetic contactor equipped with a main circuit contact strip MC-1, a-type contact strips MC-2, MC-3 which are intended for the control circuits, and a b-type contact strip MC-4 which is intended for the circuits of the indicator lamps. Of these contact strips, MC-2 is sued as the contact strip for both self-retaining and starting the action of the control circuit. MC-3 is connected, in series, to the circuits of the electromagnetic contactors MC2, MC3 and the orange lamp OL. MC-4 is connected, via a transformer $Tr_4$, to the circuit of the green lamp GL which is intended for indicating the connection of the power source. CT represents a current transformer which is provided in the main circuit. OR represents a thermal overcurrent relay, with its contact strip OR-1 being connected, in series, to the circuit of the aforesaid main electromagnetic contactor MC.

EF represents a fuse. Symbol A represents an AC ammeter. V represents an AC voltmeter. PB represents a driving pushbutton switch. PB' represents a stopping pushbutton switch. The circuits indicated by broken lines in FIG. 18 represent those for remote control or vigilance. The remainder of the arrangement is similar to that shown in FIG. 17, and therefore, its description is omitted.

In the example of connection shown in FIG. 18, the pushbutton switch PB may be depressed. Whereupon, the main electromagnetic contactor MC is energized to close its main circuit contact strip MC-1 and also to close the contact strips MC-2 and MC-3, while opening the contact strip MC-4, rendering the apparatus to the state same as that when the power switch of FIG. 17 is thrown in. Thereafter, in the order as that described in connection with FIG. 17, the apparatus can be operated automatically.

Figure 19:
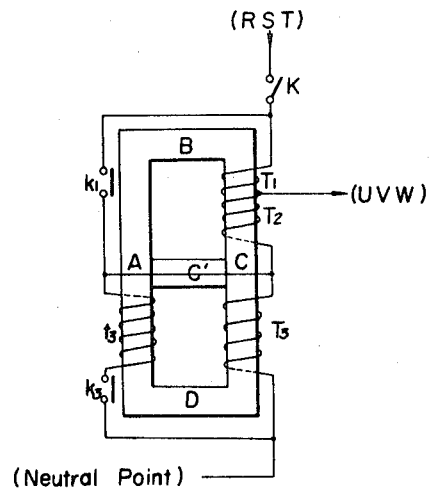

FIG. 19 shows a circuit diagram representing a modification of the circuit shown in FIG. 15. This embodiment is basically similar to that of FIG. 15. The only difference lies in that the main circuit windings $T_1$ and $T_2$ have ampere turns which are equivalent to each other and that the secondary winding $t_1$ is omitted.

In this embodiment, by closing the secondary switch $k_3$ simultaneously with the closure of the power switch K, there is impressed to the motor the following voltage:

Power source voltage $\times (T_2/T_1+T_2)$ and the motor is started under the reduced voltage.

Thereafter, when the torque which is required for the load has increased, the secondary winding switch $k_3$ may be opened. Whereupon, there is impressed to the motor the following voltage:

Power source voltage $\times (T_2+T_3/T_1+T_2+T_3)$ and, thus, the voltage applied to the motor will rise.

After the rotation speed of the motor has thus been accelerated, the switch $k_1$ is closed. Whereupon, the drop of voltage due to the main circuit windings $T_1$ and $T_2$ is cancelled out by each other since the direction of the current flowing through the main circuit winding $T_1$ is the opposite to that of the current flowing through the main circuit winding $T_2$, with the result that a voltage which is identical with that of the power source is impressed to the motor and that, accordingly, the motor can be rendered to full voltage operation.

In this embodiment, a part of the main circuit current flows through the switches $k_1$ and $k_3$. However, for the same reasons as described in connection with the embodiment of FIG. 14, their wear is also negligibly small.

Figure 20:
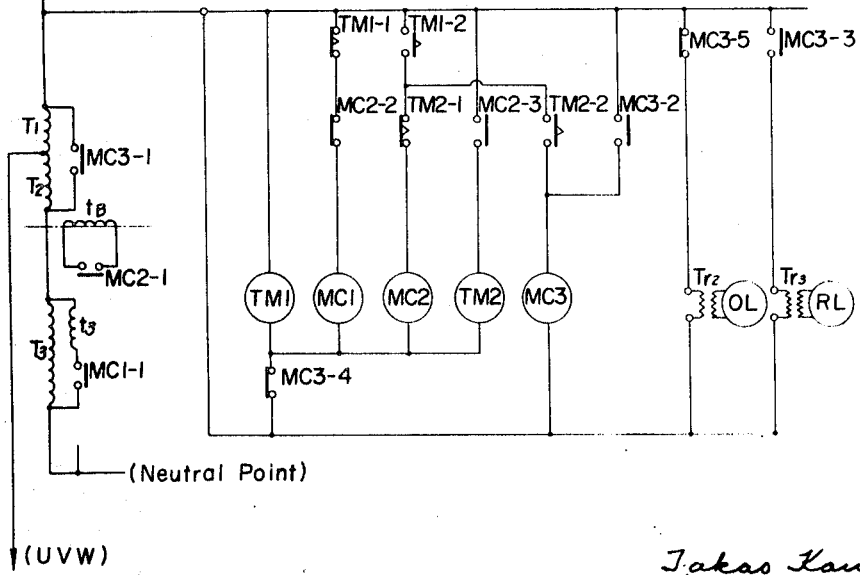

FIG. 20 is a connection diagram, showing an example of the embodiment of FIG. 19. In this drawing, $T_1$, $T_2$ and $T_3$ represent main circuit windings which are connected to each other in series. Symbol $t_3$ represents a secondary winding which is connected in parallel with the main circuit winding $T_3$. Symbol $t_B$ represents a winding provided around a bypass magnetic path in the same way as that shown in FIG. 11, and is intended for the prevention of leakage of magnetic flux. MC1-1 represents a contact strip corresponding to the switch $k_3$ in FIG. 19. MC3-1 represents a contact strip corresponding to the switch $k_1$ in FIG. 19. MC2-1 represents a contact strip for keying said winding $t_B$ which is intended for the prevention of magnetic flux. TM1 and TM2 represent time relays, respectively. MC1, MC2 and MC3 represent electromagnetic contactors, respectively.

The aforesaid time relay TM1 is equipped with a $b$-type contact strip TM1-1 and an $a$-type contact strip TM1-2. Of these tow contact strips, TM1-1 is connected to the circuit of the electromagnetic contactor MC1. On the other hand, TM1-2 is connected to the circuits of the electromagnetic contactors MC2 and MC3. The time relay TM2 is provided with a $b$-type contact strip TM2-1 and an $a$-type contact strip TM2-2. Of these two contact strips, TM2-1 is connected to the circuit of the electromagnetic contactor MC2. TM2-2 is connected to the circuit of the electromagnetic contactor MC3.

The electromagnetic contactor MC1 is of the contact strip MC1-1 which corresponds to the switch $k_3$ of FIG. 19. The electromagnetic contactor MC2 is equipped with the contact strip MC2-1 which is intended for the keying of the winding assigned for the prevention of leakage of the magnetic flux, and also with a $b$-type contact strip MC2-2 and with an $a$-type contact strip MC2-3. Of these contact strips, MC2-2 is connected to the circuit of the electromagnetic contactor MC1, while on the other hand, MC2-3 is connected to the circuit of the time relay TM2.

The electromagnetic contactor MC3 is provided with said contact strip MC3-1, $a$-type contact strips MC3-2, MC3-3, and $b$-type contact strips MC3-4, MC3-5. Of these contact strips, MC3-2 is used as the contact strip for the self-retaining of said electromagnetic contactor. On the other hand, MC3-4 is used as the contact strip for resetting the time relays TM1, TM2 and the electromagnetic contactors MC1, MC2. MC3-3 and MC3-5 are used as the switching-over contact strips for the lamps OL and RL via transformers $Tr_2$ and $Tr_3$, respectively.

In this embodiment, the power switch (not shown) may be thrown in. Whereupon, the electromagnetic contactor MC1 is energized, which is accompanied by the closing of its contact strip MC1-1 to start the motor under a reduced voltage. Simultaneously therewith, the time relay TM1 begins to be driven. Upon the arrival of the preset time of this time relay TM1, the contact strip TM1-1 thereof is opened, while on the other hand, closing the contact strip TM1-2. Accordingly, the electromagnetic contactor MC1 is reset, so that its contact strip MC1-1 is opened to effect acceleration of the rotation speed of the motor. At the same time, the electromagnetic magnetic contactor MC2 is energized, so that the contact strip MC2-1 thereof is closed. Whereby, leakage of magnetic flux owing to the bypass magnetic path is prevented. Simultaneously with the aforesaid operation, the electromagnetic contactor MC2 closes its contact strip MC2-3 to begin the driving of the time relay TM2. Upon the arrival of the preset time of this time relay, its contact strip TM2-1 is opened to reset the electromagnetic contactor MC2, while on the other hand the contact strip TM2-2 of said time relay is closed to energize the electromagnetic contactor MC3.

As the electromagnetic contactor MC3 is thus energized, it will effect self-retaining by means of its contact strip MC3-2, and also it will close the main circuit contact strip MC3-1 to render the motor to full voltage operation. On the other hand, MC3 will open its contact strip MC3-4 to reset the other electromagnetic contactors and all of the time relays. Also, the contact strips MC3-5 and MC3-4 will be switched over from one to the other to put out the orange lamp OL and to light up the red lamp RL, indicating that the motor is in normal operation.

Figure 21:
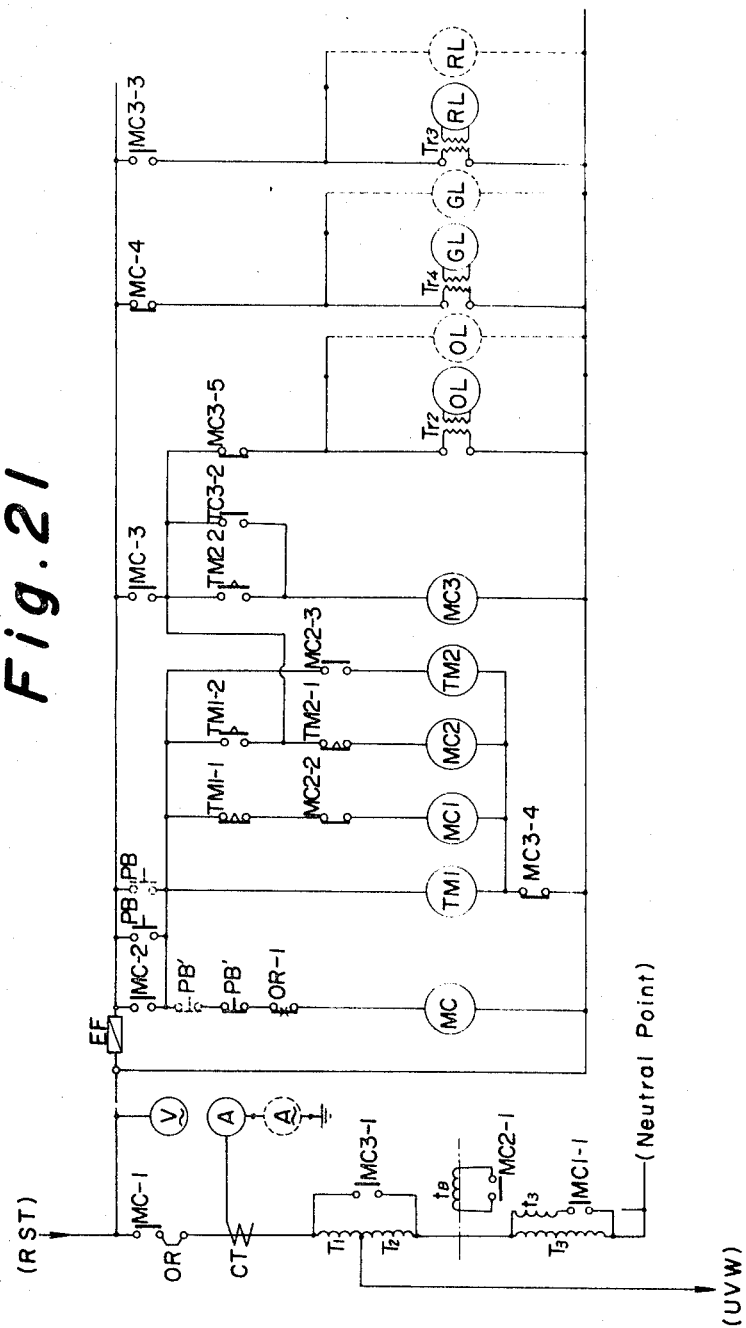

FIG. 21 shows a connection diagram similar to that given in FIG. 20. However, the difference lies in that the power switch also is arranged so as to be controlled electromagnetically, and that this switch is combined with an overcurrent relay, so that automatic operation may be effected by merely depressing the pushbutton switch.

In FIG. 21, MC represents a main electromagnetic contactor which is equipped with a main circuit contact strip MC-1, $a$-type contact strips MC-2 and MC-3 which are intended for the control circuits, and a $b$-type contact strip MC-4 for the circuits of the indicator lamps. Of these contact strips, MC-2 is used as one for self-retaining of said contactor and for starting the action of the control circuits. MC-3 is connected to the circuits of the electromagnetic contactors MC2 and MC3 and of the orange lamp OL. MC-4 is connected, via a transformer $Tr_4$, to the circuit of the green lamp GL which is intended for the connection of the power source. CT represents a current transformer which is provided in the main circuit. OR represents a thermal overcurrent relay, the contact strip OR-1 of which is connected in series with the circuit of the aforesaid main electromagnetic contactor MC. EF represents a fuse. Symbol A represents an AC ammeter. V represents an AC voltmeter. PB represents a pushbutton switch for driving the apparatus. PB' represents a stopping pushbutton switch. The circuits which are shown in dotted lines in FIG. 21 represent the circuits for use in remote control operation or for vigilance. Description of the rest of the arrangement is omitted since it is similar to that shown in FIG. 20.

In the example of circuit shown in FIG. 21, the pushbutton switch PB may be depressed. Whereupon, the main electromagnetic contactor MC is energized so that its main circuit contact strip MC-1 is closed, and at the same time the contact strips MC-2 and MC-3 are also closed, with the result that apparatus is automatically controlled to perform its operation in the mode of: starting under a reduced voltage → acceleration → full voltage operation. Also, the stages of this sequential operation are indicated by the green lamp GL, the orange lamp OR and the red lamp RL. The operation of these lamps is similar to that shown in FIG. 20, and therefore, its description is omitted.

FIGS. 22 through 27 show some embodiments in which the present invention is applied to reactor starters.

Figure 22:
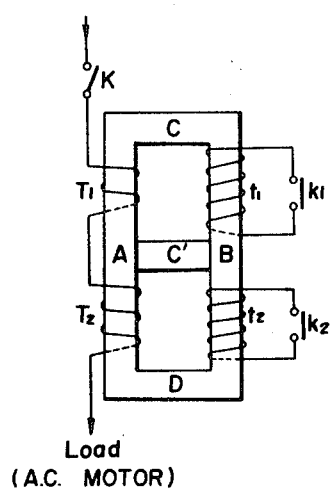

FIG. 22 shows a circuit diagram of a reactor starter for high voltage applications. In the drawing, A–C–B–D–A represents an endless magnetic path formed with laminated iron core or the like. A–C′–B represents a bypass magnetic path for dividing said endless magnetic path into two endless magnetic path sections C–B–C′–A and A–C′–B–D–A. $T_1$ and $T_2$ represent main circuit windings which are connected in series to each other. $t_1$ and $t_2$ represent secondary windings which are comprised of independent circuits, respectively, relative to the main circuit. $k_1$ and $k_2$ represent keying switches for said secondary windings $t_1$ and $t_2$. The main circuit winding $T_1$ and the secondary winding $t_1$ are provided around the magnetic path A–C–B–C′–A. The main circuit winding $T_2$ and the secondary winding $t_2$ are provided around the magnetic path A–C′–B–D–A. Said main circuit winding $T_1$ and said secondary winding $t_1$, and said main circuit winding $T_2$ and said secondary winding $t_2$ are provided in such a way that the windings in each pair have inverse but equivalent ampere turns relative to each other.

In this embodiment, the main switch K may be thrown in while the switches $k_1$ and $k_2$ are opened. Whereupon, a desired voltage drop is obtained due to the self-reactance of the main circuit windings $T_1$ and $T_2$, and thus, it is possible to start the motor at a reduced voltage. During this operation, the magnetic flux constitutes the circuit A–C–B–D–A.

After the motor has been started in the manner described as above, the switch $k_1$ may be closed. Whereupon, the reactance of the main circuit winding $T_1$ is removed by means of the secondary winding $t_1$, with the result that the voltage applied to the motor is elevated. The magnetic flux during this part of operation constitutes the circuit A–C′–B–D–A, and the magnetic path A–C–B is free of a magnetic flux.

After the rotation speed of the motor has thus been accelerated and when the number of revolution of the motor has effected a substantial increase, the switch $k_2$ may be closed. Whereupon, the reactance of the main circuit winding $T_2$ is removed by means of the secondary winding $t_2$ in the same way, and as a result, full voltage is applied to the motor, so that the motor can be rendered to the full voltage operation.

As stated above, in this instant embodiment, the reactance due to the plurality of main circuit windings which are connected in series relative to each other can be removed as desired by means of the secondary windings, so that it is possible to change, as desired, the voltage which is applied to the motor, so as to comply with the load applied to the motor or with the increase and the like in the rotation speed of the motor.

For example, if an arrangement is provided so that the main circuit winding $T_1$ is of a voltage value which is 20 percent of the value of the rated voltage applied and that the main circuit winding $T_2$ has a voltage value which is 30 percent of the value of the rated voltage applied, and that the switches $k_1$ and $k_2$ are operative in such a way that the former is closed by the time relay at the end of 15 seconds after the initial switching-on of the apparatus and that the latter is closed by the time relay at the end of 5 seconds following the completion of said 15 seconds, it will be possible to start the motor by the application of a voltage which is 50 percent of the power source voltage, and to accelerate the rotation speed of the motor by the application — following the end of 15 seconds from the time of starting the motor — a voltage which is 70 percent of the power source voltage, and then to render the motor to full voltage operation by the application — following the end of the 5 seconds from the end of said 15 seconds — of a voltage which is 100 percent of the voltage value of the power source.

By arranging the time relays to act in the manner contrary to the above arrangement so that the switch $k_2$ is closed first to accelerate the rotation speed of the motor and then the switch $k_1$ is closed to render the motor to full voltage operation, it is possible to perform an operation in the order: acceleration full voltage operation, namely, starting at the voltage of 50 percent → acceleration at the voltage of 80 percent of the value of the power source voltage.

Furthermore, depending on the load applied, it is also possible to start the motor at the voltage of either 70 percent or 80 percent of the power source voltage as desired by closing either one of the switches $k_1$ and $k_2$ when the motor is to be started.

In this particular embodiment mentioned above, there is shown an arrangement that the endless magnetic path A–C–B–D–A is bisected into two endless magnetic path sections by the interposition of a single bypass magnetic path so that the voltage which is applied to the motor may be regulated in three stages. It is needless to say, however, that, by the interposition of a plurality of bypass magnetic paths — such as at two or three places of the core — in an endless magnetic path made of a core and by increasing the number of the main circuit windings and the number of the secondary windings to correspond to the number of the resulting magnetic path sections, it is possible to regulate the voltage to be applied to the motor in a still greater number of stages.

Figure 23:
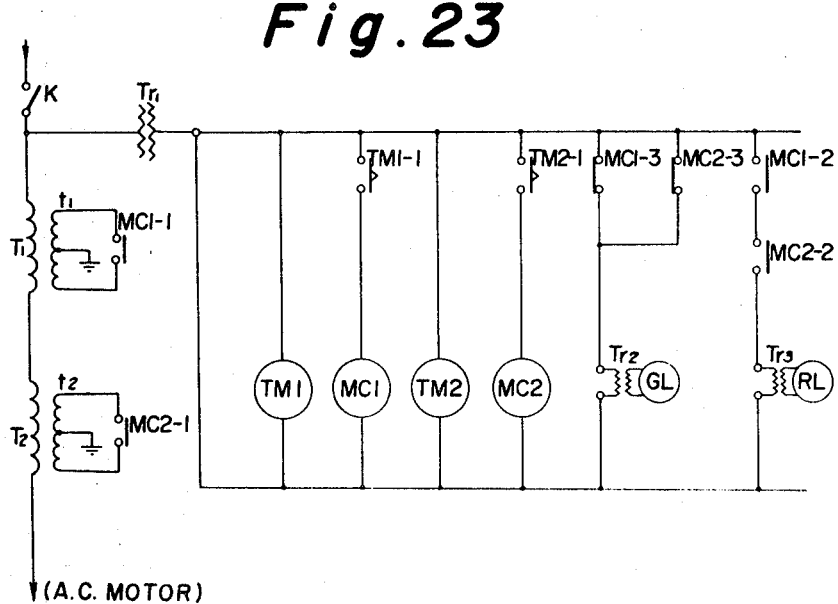

FIG. 23 is a circuit diagram showing an example of the embodiment in FIG. 22. In this drawing, $T_1$ and $T_2$ represent main circuit windings which are connected in series. $t_1$ and $t_2$ represent secondary circuit windings which are comprised of independent circuits, respectively. MC1–1 represents a contact strip corresponding to the aforesaid switch $k_1$. MC2–1 represents a contact strip corresponding to the aforesaid switch $k_2$. TM1 and TM2 represent time relays, respectively. MC1 and MC2 represent electromagnetic contactors, respectively. $Tr_1$ represents a transformer for dropping the power source voltage of 3300 v. to a controlling voltage of 220 v. $Tr_2$ and $Tr_3$ represent transformers for dropping said controlling voltage of 220 v. to 5 v. which is the voltage to be applied to the circuits of the indicator lamps. GL represents a green lamp, and RL represents a red lamp.

The time relays TM1 and TM2 employ those which can be set as desired within the range of zero to 180 seconds, respectively. The time relay TM1 has an a-type contact strip TM1–1 which is connected to the circuit of the electromagnetic contactor MC1. The time relay TM2 is of an a-type contact strip TM2–1 which is connected to the circuit of the electromagnetic contactor MC2. The electromagnetic contactor MC1 is equipped with said contact strip MC1–1 for one of the aforesaid secondary windings, an a-type contact strip MC1–2 and a b-type contact strip MC1–3. Of these contact strips, MC1–2 is connected to the circuit of the red lamp RL, and MC1–3 is connected to the circuit of the green lamp GL. The electromagnetic contactor MC2 is provided with a contact strip MC2–1 for the other of said secondary windings, an a-type contact strip MC2–2 and a b-type contact strip MC2–3. Of these contact strips, MC2–2 is connected, in series with said MC1–2, to the circuit of the red lamp RL. The contact strip MC2–3 is connected, in series with said MC1–3, to the circuit of the green lamp GL.

In this example, the power switch K may be thrown in. Whereupon, the time relays TM1 and TM2 instantly begins to be actuated. Since, however, their contact strips TM1–1 and TM2–1 are held to be open until the preset time of each of these time relays arrives, the voltage applied to the motor is caused to make a drop by virtue of the self-reactance of the main circuit windings $T_1$ and $T_2$. Assuming now that the main circuit winding $T_1$ is of a voltage value which is 20 percent of the power source voltage value and that the voltage value of $T_2$ is 30 percent likewise, the motor may be started by the application of a voltage which is 50 percent of the value of the power source voltage. Upon the subsequent arrival of the preset time of one of the time relays TM1 and TM2, its contact strip TM1–1 or TM2–1 is closed. Accordingly, one of the electromagnetic contactors MC1 and MC2 is energized to close its contact strip MC1-1 or MC2-1. As a result, the rotation speed of the motor is accelerated by the application of a voltage which is 70 percent or 80 percent of the value of the power source voltage. Upon the subsequent arrival of the preset time of the other of the time relays, the contact strip of this time relay is closed to energize the other of the electromagnetic contactors, so that both of the contact strips MC1-1 and MC2-1 are closed to switch the motor into full voltage operation. At the same time, the green lamp GL is put out and the red lamp RL is lighted up, indicating that the motor is now in normal operation.

Figure 24:
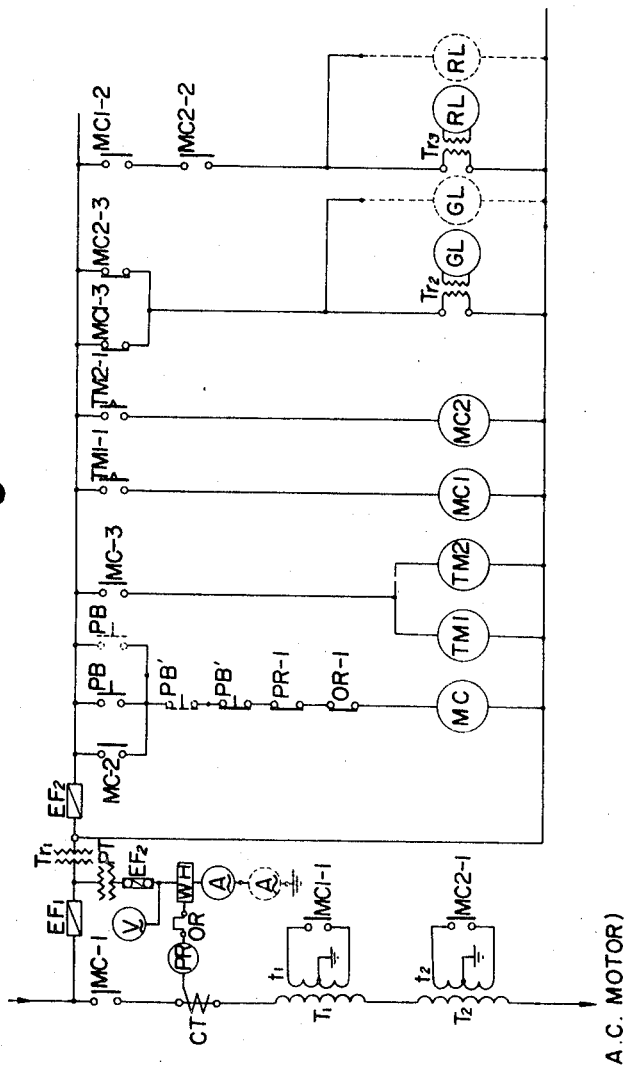

FIG. 24 is a modified example of the circuitry of FIG. 23, and shows an arrangement enabling also the power switch to be opened and closed electromagnetically. In FIG. 24, MC represents a main electromagnetic contactor which is provided with a main circuit contact strip MC-1 and control circuit contact strips MC-2 and MC-3. Of these two contact strips, MC-2 is used as the self-retaining contact strip of the main electromagnetic contactor. CT represents a current transformer. PR represents a short circuit protective relay. OR represents a thermal overcurrent relay. The contact strips PR-1 and OR-1 of these two relays are connected in series to the circuit of said main electromagnetic contactor MC. WH represents an integrated wattmeter. Symbol A represents an AC ammeter. V represents an AC voltmeter. $EF_1$ represents a high voltage fuse. $EF_2$ represents a low voltage fuse. PT represents a transformer for meters. $Tr_1$ represents a transformer for dropping the power source voltage of 3300 v. to a controlling voltage of 220 v. $Tr_2$ and $Tr_3$ represent transformers for dropping said voltage of 220 v. to 5 v. which is for the circuit of the indicator lamps. PB represents a driving pushbutton switch. PB' represents a stopping pushbutton switch. The circuits shown in dotted lines in the drawing represent those for remote control or for vigilance. The rest of the arrangement is exactly the same as that shown in FIG. 23, and therefore, the description of the same is omitted.

In the example shown in FIG. 24 which embodies the present invention, the pushbutton switch PB may be depressed. Whereupon, the main electromagnetic contactor MC is energized to close its main circuit contact strip MC-3. This is self-retained by virtue of the contact strip MC-2. On the other hand, MC-3 is actuated to begin to drive the time relays TM1 and TM2. Thereafter, in a sequential steps similar to those described with respect to the example of FIG. 23, it is possible to perform a sequential operation in the order: starting at a reduced voltage → acceleration → full voltage operation, and this will be easily understood.

Figure 25:
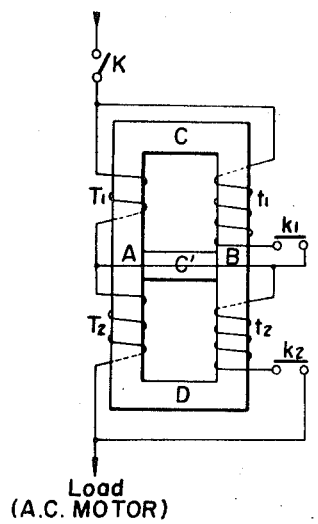

FIG. 25 shows another embodiment which is intended to explain the principle of the invention when applied to a low voltage reactor starter up to the order of 400 v., though basically the same with the one shown in FIG. 22.

More specifically, the example of FIG. 22 is such that the secondary windings $t_1$ and $t_2$ are provided in the form of independent circuits which are not related to the main circuit and that the main circuit current is allowed to flow only through the main circuit windings $T_1$ and $T_2$. In contrast to this, the embodiment of FIG. 25 is arranged so that; in case both of the switches $k_1$ and $K_2$ of the secondary windings $t_1$ and $t_2$ are open, the main circuit current is allowed to flow only through the primary windings $T_1$ and $T_2$, and that, in case either one or both of the switches $k_1$ and $k_2$ is closed, the main circuit current is allowed to flow through both of the primary windings and the secondary windings. In other words, this embodiment differs from the one shown in FIG. 22 in that the former is arranged so that, when the switches $k_1$ and $k_2$ of the secondary windings are closed, the main circuit current is shared by both the primary windings and the secondary windings. The rest of the arrangement of this embodiment is similar to that of FIG. 22.

In this embodiment also, the voltage which is applied to the load is the lowest when the switches $k_1$ and $k_2$ are open. However, if either one of the switches $k_1$ and $k_2$ is closed, a higher voltage may be applied to the load. If both of these switches are closed, it is possible to perform full voltage operation in exactly the same way as is the case with the example of FIG. 22.

Figure 26:
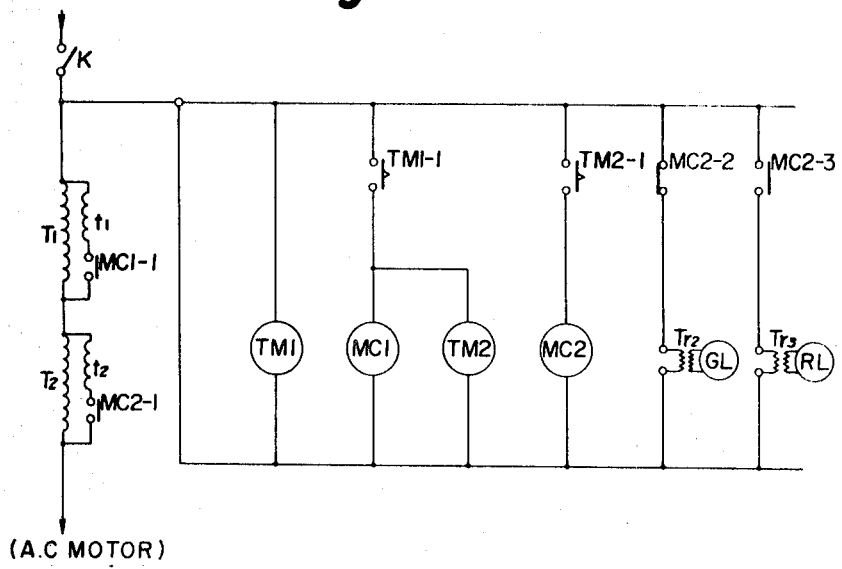

FIG. 26 shows an example of the embodiment of FIG. 25. In the drawing, $T_1$ and $T_2$ represent main circuit primary windings which are connected in series. $t_1$ and $t_2$ represent secondary windings. MC1—1 represents a contact strip corresponding to the aforesaid switch $k_1$. MC2-1 represents a contact strip corresponding to the aforesaid switch $k_2$. TM1 and TM2 represent time relays, respectively. MC1 and MC2 represent electromagnetic contactors, respectively. GL represents a green lamp for indicating the connection of the power source. RL represents a red lamp for indicating that the motor is in normal operation. $Tr_2$ and $Tr_3$ represent transformers for the indicator lamps, respectively.

The time relay TM1 is provided with an $a$ type contact strip TM1-1 which is connected to the circuits of the electromagnetic contactor MC1 and of the time relay TM2. The time relay TM2 is of an $a$-type contact strip TM2-1 which is connected to the circuit of the electromagnetic contactor MC2. The electromagnetic contactor MC1 is of the contact strip MC1-1 intended for said secondary winding and which is adapted to close when said contactor is energized. The electromagnetic contactor MC2 is of the contact strip MC2-1 for the previously mentioned secondary winding and which is adapted to close when said contactor MC2 is energized, and is also of contact strips MC2-2 and MC2-3 for effecting the changeover of the connections of the green lamp and the red lamp.

In the case of this example, the power switch K may be thrown in. Whereupon, the time relay TM1 begins to be driven. Since, however, the switches of the secondary windings $t_1$ and $t_2$ remain to be open until the arrival of the preset time of this time relay, there can be obtained a maximum voltage drop by virtue of the primary windings $T_1$ and $T_2$. When, subsequently, the preset time of the time relay TM1 arrives, the electromagnetic contactor MC1 is energized to close its contact strip MC1-1 so that the voltage applied to the load is elevated. Subsequently, when the preset time of the time relay TM2 arrives, the electromagnetic contactor MC2 is energized to close its contact strip MC2-1 so that full voltage is applied to the load. At the same time, the green lamp is put out and the red lamp is lighted up, to indicate that the apparatus is in its full voltage operation.

Figure 27:
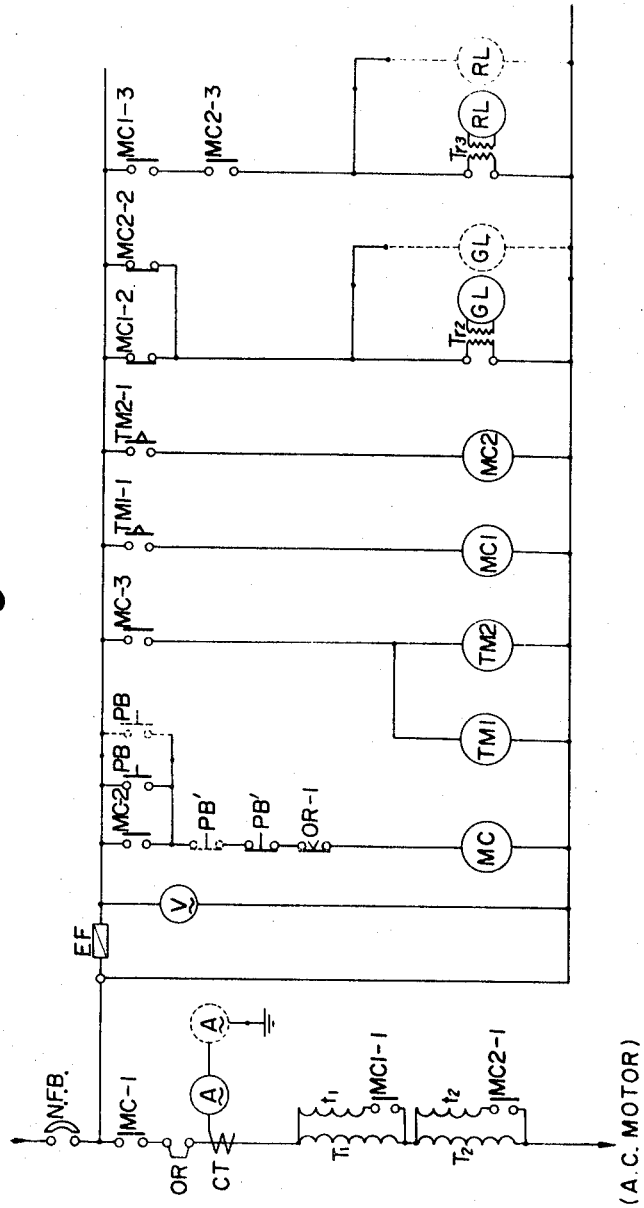

FIG. 27 shows a modification of the arrangement of FIG. 26. It shows an example of the arrangement that the starter is operated by the manipulation of a pushbutton switch.

In FIG. 27, MC represents a main electromagnetic contactor which is provided with a main circuit contact strip MC-1 and with contact strips MC-2 which are intended for the control circuits. Of these contact strips, MC-2 is used as the self-retaining contact strip of the contactor, and MC-3 is used as one for starting the controlling action. CT represents a current transformer. OR represents a thermal overcurrent relay. The contact strip OR-1 of this relay is connected in series to the circuit of the main electromagnetic contactor. NFB represents a no-fuse breaker. EF represents a cartridge fuse. Symbol A represents an AC ammeter. V represents an AC voltmeter. $Tr_2$ and $Tr_3$ represent transformers for indicator lamps. PB represents a driving pushbutton switch. PB' represents a stopping pushbutton switch. In the drawing, dotted lines represent circuits for effecting remote control or for vigilance. The rest of the arrangement is exactly the same as that of the example of FIG. 26.

In the case of the example just mentioned, the pushbutton switch PB may be thrown in. Whereupon, the main electromagnetic contactor MC is energized to close its main circuit contact strip MC-1, and at the same time, this is selfretained by virtue of the contact strip MC-2. On the other hand, the time relays TM1 and TM2 begins to be driven by means of the contact strip MC-3. Thereafter, in the same way as that described in connection with FIG. 26, a sequential operation, i.e. starting at a reduced voltage → acceleration → full voltage operation is performed automatically.

The starting compensators, reactor starters and the like embodying the present invention are of a number of advantages that not only multistage voltage regulation can be performed with utmost easiness, but also the changeover switches are such that, even for the high voltage circuits, there can be used low voltage switches, so that the apparatuses can be made in markedly compact sizes and at low, costs.

Figure 28:
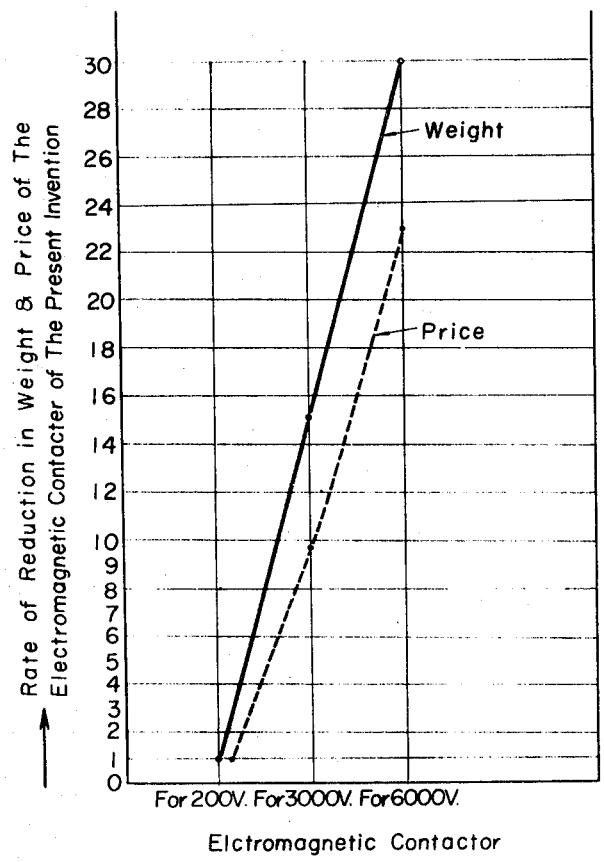
FIG. 28 is a diagrammatic chart showing the comparison of the weight and the price of the electromagnetic contactors for use in the main circuit in the conventional starting compensator in FIG. 1 with those of the electromagnetic contactors for use in making and breaking the secondary winding circuits used in those embodiments of the present invention as shown in FIGS. 2, 6, 9, 10 and 11.

Comparison is made in FIG. 28 on the weight and the cost between the electromagnetic contactor which is required for conventional starting compensators as shown in FIG. 1 and the electromagnetic contactor which is required for the embodiments such, for example, as shown in FIGS. 2 or 6.

More specifically, in conventional starting compensators, if the circuit was intended for the application of 3000 v., there was required an electromagnetic contactor which was designed for the application of 3000 v., and similarly, for a circuit of 6000 v., the use of an electromagnetic contactor having the capacity of 6000 v. was necessary. In contrast to this, according to the present invention, even for a high voltage circuit of 6000 v., it is sufficient to use an electromagnetic contactor having the capacity of 200 v. Therefore, if the circuit is for 3000 v. as shown in FIG. 28, it will only be necessary to use an electromagnetic contactor which is about one-fifteenth in weight and about one-tenth in cost of the conventional electromagnetic contactor designed for such a high voltage circuit. In the case of 6000 v. circuit, it is only necessary to use an electromagnetic circuit which is about one-thirtieth in weight and one twenty-third in cost. In addition, there can be provided a starting compensator or a reactor starter which is substantially free of wear of its contacts and which, accordingly, is of a prolonged service life and which can be made at a very low cost.

Description has been made on instances in which the present invention is applied to starting compensators and reactor starters intended for AC motors. It is needless to say that, by the adoption of the present invention, it is possible to perform multistage voltage regulation of various other types of AC machines and instruments in the manner exactly the same as that described heretofore.

We claim:

1. A multistage voltage regulating apparatus for AC machines and instruments, comprising:
   an endless magnetic path divided into a plurality of endless magnetic path sections by the interposition of at least one bypass magnetic path therein,
   a plurality of main circuit windings connected in series with each other,
   secondary windings corresponding to said main circuit windings,
   each of said endless magnetic path sections having, therearound, at least one of said plurality of main circuit windings and at least one of said secondary windings,
   said at least one secondary winding having ampere turns inverse to but equivalent to the corresponding said at least one main circuit winding provided around each one of the endless magnetic path sections, whereby, a multistage regulation of the voltage applied to the load may be effected by opening and closing the circuits of said secondary windings, and
   a magnetic flux leakage preventing winding means wound about said at least one bypass magnetic path for controlling the magnetic flux therein by opening and closing the circuit of said preventing winding means whereby the correct value of regulated voltage may be maintained when said bypass path is not utilized.

2. A multistage voltage regulating apparatus according to claim 1, in which said circuits of the secondary windings are independent of the main circuit and these independent circuits are adapted to be opened and closed by means of electromagnetic contactors and the like.

3. A multistage voltage regulating apparatus according to claim 1, in which said second windings are connected in parallel with said main circuit windings so that when said circuits of the secondary windings are closed, a part of the main circuit current is shared by said secondary windings.

4. A starting compensator for AC motors, comprising:
   an endless magnetic path divided into a plurality of endless magnetic path sections by the interposition therein of at least one bypass magnetic path,
   a plurality of main circuit windings connected in series with each other,
   secondary windings corresponding to said main circuit windings,
   each of said endless magnetic path sections having, therearound, at least one of said plurality of main circuits windings and at least one of said secondary windings,
   said at least one secondary winding having ampere turns inverse to but equivalent to the corresponding said at least one main circuit winding provided around each one of the endless magnetic path sections,
   said main circuit windings being connected at an intermediate site thereof to the AC motor,
   said main circuit windings being connected at the terminal end thereof to a neutral point, whereby, a multistage regulation of the voltage applied to said motor may be effected by opening and closing the circuits of said secondary windings, and
   a magnetic flux leakage preventing winding means wound about said at least one bypass magnetic path for controlling the magnetic flux therein by opening and closing the circuit of said preventing winding means whereby the correct value of regulated voltage may be maintained when said bypass path is not utilized.

5. A starting compensator according to claim 4, in which:
   said endless magnetic path is bisected into two endless magnetic path sections,
   said plurality of main circuit windings comprises three windings connected in series,
   said secondary windings corresponding to said plurality of main circuit windings comprises two windings,
   one of said three main circuit windings located closest to the power source side being provided around one of said bisected two magnetic path sections, the remaining two main circuit windings being provided around the other of said bisected magnetic path sections,
   said two main circuit windings being connected at an intermediate site thereof to the AC motor,
   said two main circuit windings being connected at the terminal end thereof to a neutral point,
   said one of the bisected two magnetic path sections provided therearound with one of said three main circuit windings being provided further with one of said secondary windings having ampere turns inverse to but equivalent to said one of the three main circuit windings,
   the other of said bisected two magnetic path sections provided therearound with said two main circuit windings being provided therearound with the other of the secondary windings having ampere turns inverse to but equivalent to the main circuit winding located closer to the power source side among said remaining two main circuit windings,
   said starting compensator being operative in such a way that the motor is started at a reduced voltage by closing the neutral point switch while opening the connections of the circuits of both of said secondary windings, then accelerating the rotation speed of the motor by closing either one of the circuits of the two secondary windings, and then performing full voltage operation by closing the other of the circuits of one two secondary windings and opening said neutral point switch and with the circuit of said flux leakage preventing winding being closed to effectively prevent leakage flux through said bypass path during the time that both secondary winding circuits are opened.

6. A starting compensator according to claim 5, in which the circuits of said secondary windings are independent of the main circuit.

7. A starting compensator according to claim 5, in which said secondary windings are connected in parallel with said main circuit windings.

8. A starting compensator according to claim 4, in which:
said endless magnetic path is bisected into two endless magnetic path sections,
said plurality of main circuit windings comprises three windings connected in series,
said secondary windings corresponding to said plurality of main circuit windings comprises two windings,
two of said three main circuit windings located on the power source side being provided around one of said bisected two magnetic path sections,
the remaining one main circuit winding being provided around the other of said bisected two magnetic path sections,
said two main circuit windings being connected at an intermediate site thereof to the AC motor,
said two main circuit windings being connected at the terminal end thereof to a neutral point,
said one of the bisected two magnetic path sections provided therearound with two of said three main circuit windings being provided therearound with one of said two secondary circuit windings having ampere turns inverse to but equivalent to the main circuit winding located closer to the power source side among said two,
the other of said bisected two magnetic path sections provided therearound with the remaining one main circuit winding being provided therearound with the other of said two secondary windings having ampere turns inverse to but equivalent to said remaining one main circuit winding,
said starting compensator being operative in such a way that the AC motor is started at a reduced voltage by opening the circuit of the secondary winding corresponding to the main circuit winding located closer to the power source side and at the same time closing the circuit of the secondary winding corresponding to the main circuit winding closer to the neutral point, then accelerating the rotation speed of said motor by opening the circuits of both of said secondary windings thereby elevating the voltage applied to said motor, and then performing full voltage operation by closing the circuit of the secondary winding corresponding to the main circuit winding located closer to the power source side and with the circuit of said flux leakage preventing winding being closed to effectively prevent leakage flux through said bypass path during the time that both secondary winding circuits are opened.

9. A starting compensator according to claim 8, in which a plurality of selective terminals are provided between said two main circuit windings located on the power.

10. A starting compensator according to claim 8, in which the circuits of the secondary windings are independent of the main circuit.

11. A starting compensator according to claim 6, in which said secondary windings are connected in parallel with said main circuit windings.

12. A starting compensator according to claim 4, in which there are provided time relays and electromagnetic contactors to control the opening and closing of the circuits of the respective secondary windings.

13. A starting compensator according to claim 12, in which there are provided a main electromagnetic contactor and a pushbutton switch for energying said contactor upon the depression of said button so that the main circuit windings are connected to a power source by means of the main contact strip of said main electromagnetic contactor and this condition of said main electromagnetic contactor is self-retained by means of another contact strip thereof and also said time relays, electromagnetic contactors for control circuits and the like may be connected by still other contact strips of said main electromagnetic contactor.

14. A reactor starter comprising:
an endless magnetic path divided into a plurality of endless magnetic path sections by the intervention therein of at least one bypass magnetic path,
a plurality of main circuit windings connected in series with each other,
secondary windings corresponding to said main circuit windings,
each of said endless magnetic path sections having, therearound, at least one of said plurality of main circuit windings and at least one of said secondary windings,
said at least one secondary winding having ampere turns inverse to but equivalent to the corresponding said at least one main circuit winding provided around each one of the endless magnetic path sections, whereby a multistage regulation of the voltage applied to a motor connected to the terminal end of said main circuit winding may be effected by opening and closing the circuits of said secondary windings and,
a magnetic flux leakage preventing winding means wound about said at least one bypass magnetic path for controlling the magnetic flux therein by opening and closing the circuit of said preventing winding means whereby the correct value of regulated voltage may be maintained when said bypass path is not utilized.

15. A reactor starter according to claim 14, in which the circuits of said secondary windings are independent of the main circuit.

16. A reactor starter according to claim 14, in which said secondary windings are connected in parallel with their corresponding main circuit windings.

17. A reactor starter according to claim 14, in which:
said divided plurality of endless magnetic path sections comprise two sections,
said plurality of main circuit windings comprise two such windings, whereby three stage voltage regulation may be performed in order as follows: starting the motor at a reduced voltage, increasing the voltage and accelerating the motor speed, full voltage operation.

18. A reactor starter according to claim 14, in which there are provided time relays and electromagnetic contactors to control the opening and closing of the circuits of said secondary windings.

19. A reactor starter according to claim 18, in which there are provided a main electromagnetic contactor and a pushbutton switch for energying said contactor upon the depression of said button so that the main circuit windings are connected to a power source by means of the main contact strip of said main electromagnetic contactor and this condition of said main electromagnetic contactor is self-retained by means of another contact strip thereof and also said time relays, electromagnetic contactors for control circuits and the like may be connected by still other contact strips of said main electromagnetic contactor.